US012607227B2

(12) United States Patent
Iino et al.

(10) Patent No.: US 12,607,227 B2
(45) Date of Patent: Apr. 21, 2026

(54) ROLLING BEARING, ROTATING DEVICE, AND METHOD FOR MANUFACTURING ROLLING BEARING

(71) Applicant: Seiko Instruments Inc., Chiba (JP)

(72) Inventors: Akihiro Iino, Chiba (JP); Takayuki Kosaka, Chiba (JP); Haruhiko Hasegawa, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 76 days.

(21) Appl. No.: 18/666,504

(22) Filed: May 16, 2024

(65) Prior Publication Data

US 2024/0392832 A1     Nov. 28, 2024

(30) Foreign Application Priority Data

May 26, 2023     (JP) .................................. 2023-086816
Apr. 12, 2024     (JP) .................................. 2024-064936

(51) Int. Cl.
| | |
|---|---|
| *F16C 19/06* | (2006.01) |
| *F16C 33/58* | (2006.01) |
| *F16C 33/66* | (2006.01) |
| *F16C 33/78* | (2006.01) |

(52) U.S. Cl.
CPC ........ *F16C 33/6614* (2013.01); *F16C 33/583* (2013.01); *F16C 33/782* (2013.01); *F16C 33/783* (2013.01); *F16C 33/7846* (2013.01); *F16C 19/06* (2013.01)

(58) Field of Classification Search
CPC .... F16C 19/06; F16C 33/583; F16C 33/6607; F16C 33/6614; F16C 33/782; F16C 33/783; F16C 33/7846
See application file for complete search history.

(56) References Cited

FOREIGN PATENT DOCUMENTS

| | | | | | |
|---|---|---|---|---|---|
| JP | 11002248 | A | * | 1/1999 | |
| JP | 2015086940 | A | * | 5/2015 | .......... F16C 33/3856 |
| JP | 2017-150615 | A | | 8/2017 | |
| JP | 7209902 | B1 | * | 1/2023 | ............ F16C 33/583 |

OTHER PUBLICATIONS

JP2015086940_A_Description.*
JP7209902_B1_Description.*

* cited by examiner

*Primary Examiner* — Phillip A Johnson
(74) *Attorney, Agent, or Firm* — Crowell & Moring LLP

(57) ABSTRACT

To provide a rolling bearing capable of ensuring durability and reducing rotational resistance. The rolling bearing includes an inner ring and an outer ring disposed coaxially with each other; a rolling body disposed between the inner ring and the outer ring; a sealing member mounted on the outer ring and covering a space between the inner ring and the outer ring from an outer side in an axial direction; and grease disposed between the rolling body and the sealing member. The outer ring has an inner circumferential surface facing the inner ring. The inner circumferential surface is formed with an outer ring raceway surface that supports the rolling body in a rollable manner, and a recessed portion that is provided at a location extending in the axial direction from an end edge of the outer ring raceway surface in the axial direction and is recessed in a radial direction. The grease is in contact with the recessed portion.

19 Claims, 10 Drawing Sheets

ROLLING BEARING, ROTATING DEVICE, AND METHOD FOR MANUFACTURING ROLLING BEARING

RELATED APPLICATIONS

This application claims priority to Japanese Patent Application No. JP2023-086816 filed on May 26, 2023 and Japanese Patent Application No. JP2024-064936 filed on Apr. 12, 2024, the entire content of which is incorporated herein by reference.

BACKGROUND OF THE INVENTION

1. Field of the Invention

The present invention relates to a rolling bearing, a rotating device, and a method for manufacturing a rolling bearing.

2. Description of Related Art

In the related art, there is a rolling bearing that holds grease between a pair of bearing rings (an inner ring and an outer ring). In this type of rolling bearing, resistance of the grease may cause an increase in rotational resistance. In the rolling bearing, it is desired to reduce the rotational resistance for the purpose of saving power of a rotating device on which the rolling bearing is mounted. In particular, in a small rolling bearing used in various motors such as a fan motor, there is a strong demand for reduction in rotational resistance.

In order to reduce the rotational resistance of the rolling bearing, it is effective to reduce an amount of grease that comes into contact with both members that rotate relative to each other. Therefore, an amount of grease that comes into contact with a rolling body (ball) and a cage that holds the rolling body is reduced by applying grease to an end portion of a fixed ring (an outer ring in many cases) of the rolling bearing in an axial direction and a sealing member disposed on the end portion side (for example, see PTL 1). In the rolling bearing disclosed in PTL 1, grease adheres to an inner circumferential surface of the outer ring, avoiding a raceway surface that comes into contact with the rolling body, and is enclosed in an annular shape toward an inner circumferential surface side of the outer ring so as not to come into contact with an outer circumferential surface of an inner ring.

SUMMARY OF THE INVENTION

However, when the amount of grease is reduced in order to reduce the rotational resistance, there is a possibility that a life of the rolling bearing is shortened due to a shortage of grease. Therefore, the rolling bearing in the related art has a problem of ensuring durability and reducing rotational resistance.

Therefore, an object of the invention is to provide a rolling bearing, a rotating device, and a method for manufacturing a rolling bearing, which can ensure durability and reduce rotational resistance.

A rolling bearing according to a first aspect of the invention includes: an inner ring and an outer ring disposed coaxially with each other; a rolling body disposed between the inner ring and the outer ring; a sealing member mounted on the inner ring or the outer ring and covering a space between the inner ring and the outer ring from an outer side in an axial direction; and grease disposed between the rolling body and the sealing member, in which one bearing ring of the inner ring and the outer ring has a circumferential surface facing the other bearing ring, the circumferential surface is formed with a raceway surface that supports the rolling body in a rollable manner, and a recessed portion that is provided at a location extending in the axial direction from an end edge of the raceway surface in the axial direction and is recessed in a radial direction, and the grease is in contact with the recessed portion.

According to the first aspect, the recessed portion can restrict the grease from being displaced in the axial direction. Accordingly, it is possible to prevent the grease from being displaced and coming into contact with the rolling body or the like by a desired amount or more. Thus, rotational resistance of the rolling bearing can be reduced. Further, since the grease can be disposed inside the recessed portion, a total amount of the grease can be increased as compared with a configuration in which the recessed portion is not formed. As described above, it is possible to provide a rolling bearing capable of ensuring durability and reducing rotational resistance.

The rolling bearing according to a second aspect of the invention may be configured such that in the rolling bearing according to the first aspect, the grease is in contact with a location of the recessed portion that faces a direction inclined outward in the axial direction with respect to the radial direction.

According to the second aspect, the location of the recessed portion that faces the direction inclined outward in the axial direction with respect to the radial direction restricts the grease from being displaced inward in the axial direction from an initial state. Accordingly, since the grease is less likely to be displaced inward in the axial direction from an initial position in a process of repeated use of the rolling bearing, it is possible to increase an amount of the grease to be enclosed, and it is possible to obtain the above-described operation and effect more reliably. A shape and position of the grease are less likely to change due to vibration during transportation or storage for a long period (particularly, storage in a high-temperature environment). Therefore, it is possible to provide the rolling bearing in which a fluctuation in the rotational resistance from an initial stage of manufacturing is reduced.

The rolling bearing according to a third aspect of the invention may be configured such that in the rolling bearing according to the first aspect or the second aspect, the recessed portion has a location that faces a direction inclined inward in the axial direction with respect to the radial direction.

According to the third aspect, the location of the recessed portion that faces the direction inclined inward in the axial direction with respect to the radial direction restricts the grease from being displaced outward in the axial direction. Accordingly, it is possible to prevent the grease or base oil of the grease from flowing out to a sealing member side and leaking from a gap between the sealing member and the one bearing ring.

The rolling bearing according to a fourth aspect of the invention may be configured such that in the rolling bearing according to any one of the first aspect to the third aspect, the grease is in contact with the sealing member.

According to the fourth aspect, when the sealing member is mounted in a state where the grease is applied to the one bearing ring, even when the grease in contact with the sealing member is pressed inward in the axial direction by the sealing member, the grease is restricted, by the recessed portion, from being displaced inward in the axial direction. Therefore, it is possible to prevent the grease from coming into contact with the rolling body or the like by a desired amount or more. Therefore, the rotational resistance of the rolling bearing can be reduced.

In particular, when the grease is in contact with the location of the recessed portion that faces the direction inclined outward in the axial direction with respect to the radial direction, the grease is supported by the sealing member in addition to the recessed portion. Therefore, the shape and position of the grease are less likely to be changed due to vibration during transportation or storage for a long period (particularly, storage in a high-temperature environment). Therefore, it is possible to provide the rolling bearing in which a fluctuation in the rotational resistance from an initial stage of manufacturing is reduced.

The rolling bearing according to a fifth aspect of the invention may be configured such that in the rolling bearing according to any one of the first aspect to the fourth aspect, the recessed portion is provided with an interval in the axial direction with respect to the raceway surface.

According to the fifth aspect, the grease in the recessed portion can be prevented from coming into contact with the rolling body that rolls on the raceway surface. Accordingly, it is possible to reduce an increase in the rotational resistance of the rolling bearing.

The rolling bearing according to a sixth aspect of the invention may be configured such that in the rolling bearing according to any one of the first aspect to the fifth aspect, the one bearing ring has a protruding portion that protrudes toward the other bearing ring side and on which the circumferential surface is formed, the protruding portion has an end surface that faces outward in the axial direction and is connected to the circumferential surface at a circumferential edge on the other bearing ring side, and the recessed portion is provided with an interval in the axial direction with respect to the end surface.

According to the sixth aspect, it is possible to prevent the grease or the base oil of the grease from flowing out from the recessed portion to an end surface side and leaking from a gap between the end surface and the sealing member.

The rolling bearing according to a seventh aspect of the invention may be configured such that in the rolling bearing according to any one of the first aspect to the sixth aspect, the recessed portion continuously extends throughout a circumferential direction.

According to the seventh aspect, the grease disposed along the circumferential direction is less likely to be, by the recessed portion, displaced in the axial direction over an entire length of the grease. Thus, the rotational resistance of the rolling bearing can be reduced. Further, compared with a configuration in which the recessed portion is formed discontinuously in the circumferential direction, an amount of grease disposed inside the recessed portion can be increased.

The rolling bearing according to an eighth aspect of the invention may be configured such that in the rolling bearing according to any one of the first aspect to the seventh aspect, the grease is in contact with a ridge portion formed at an end edge of the recessed portion on a raceway surface side.

According to the eighth aspect, it is not necessary for the base oil oozing from the grease to go over the ridge portion in a process of reaching the raceway surface, and an insufficient supply of the base oil of the grease to the rolling body can be prevented.

The rolling bearing according to a ninth aspect of the invention may be configured such that in the rolling bearing according to any one of the first aspect to the eighth aspect, the one bearing ring has a protruding portion that protrudes toward the other bearing ring side and on which the circumferential surface is formed, the protruding portion has an end surface that faces outward in the axial direction and is connected to the circumferential surface at a circumferential edge on the other bearing ring side, the circumferential surface has a connection surface formed between the recessed portion and the end surface, and the connection surface is further away from the other bearing ring in the radial direction than an end edge of the raceway surface in the axial direction.

According to the ninth aspect, since the grease is discharged from a nozzle and applied to a predetermined location, when a tip end of the nozzle is inserted into the outer ring and the inner ring from an outside of the rolling bearing, it is possible to make the connection surface less likely to come into contact with the nozzle. Therefore, the nozzle can be easily brought close to the recessed portion when the grease is applied, and productivity of the small-diameter rolling bearing can be improved. Since the nozzle can be easily brought close to the recessed portion, the grease can be accurately applied, and it is possible to prevent the grease from coming into contact with the rolling body or the like by a desired amount or more. Thus, the rotational resistance of the rolling bearing can be reduced.

The rolling bearing according to a tenth aspect of the invention may be configured such that in the rolling bearing according to any one of the first aspect to the ninth aspect, the circumferential surface includes an inclined portion extending from an end edge of the recessed portion on a raceway surface side toward the raceway surface side while being inclined with respect to the radial direction and the axial direction.

According to the tenth aspect, even when an end portion of the recessed portion on the raceway surface side extends along the radial direction, the circumferential surface is gradually inclined from the recessed portion toward the raceway surface. Therefore, it is possible to promote flow of the base oil oozing from the grease from the recessed portion along the inclined portion toward the raceway surface. Therefore, even when the grease is not disposed close to the raceway surface, an insufficient supply of the base oil of the grease to the rolling body can be prevented.

The rolling bearing according to an eleventh aspect of the invention may be configured such that in the rolling bearing according to the tenth aspect, the grease is disposed so as not to protrude from an inner side of the recessed portion toward an inclined portion side in the radial direction.

According to the eleventh aspect, the grease can be prevented from coming into contact with the rolling body. On the other hand, by reducing an amount of the grease applied, it is possible to suitably obtain an effect of preventing an insufficient supply of base oil of the grease to the rolling body as described above.

The rolling bearing according to a twelfth aspect of the invention may be configured such that in the rolling bearing according to any one of the first aspect to the eleventh aspect, the sealing member includes an annular pedestal portion that is in contact with the one bearing ring from the outer side in the axial direction, an extension portion that extends outward in the axial direction from a circumferential edge of the pedestal portion on the other bearing ring side, and a planar portion that extends along the radial direction from an end edge of the extension portion on the outer side in the axial direction toward the other bearing ring, the grease includes a bearing ring contact portion that is in contact with the circumferential surface of the one bearing ring, and a sealing member contact portion that is in contact with the planar portion on the outer side in the axial direction and the other bearing ring side relative to the bearing ring contact portion, and an area of the sealing member contact portion is larger than a contact area between the grease and the extension portion and the pedestal portion of the sealing member.

According to the twelfth aspect, when the sealing member is mounted after the grease is applied to a predetermined location, it is possible to provide a space for the grease pressed inward in the axial direction by the planar portion of the sealing member to spread in the radial direction toward the extension portion and the pedestal portion. Therefore, the grease can be prevented from spreading largely toward a one bearing ring side and a rolling body side. Thus, the grease can be easily prevented from directly contacting the rolling body and the one bearing ring.

Moreover, since the extension portion is provided between the planar portion and the pedestal portion in the sealing member, the grease can be disposed at a position further away from the rolling body than in a configuration in which the planar portion extends along the radial direction from the pedestal portion. Thus, an amount of the grease can be increased.

As described above, it is possible to provide a rolling bearing capable of ensuring durability and reducing rotational resistance.

The rolling bearing according to a thirteenth aspect of the invention may be configured such that in the rolling bearing according to the twelfth aspect, the sealing member contact portion includes a center position of the grease in the radial direction when viewed from the axial direction.

According to the thirteenth aspect, when the sealing member is mounted, the grease spreads in the radial direction by being pressed by the planar portion, and as a result, since the sealing member contact portion including the center position of the grease in the radial direction in the plan view, it is possible to prevent the grease from spreading largely inward in the axial direction toward the rolling body. Thus, the grease can be easily prevented from directly contacting the rolling body.

The rolling bearing according to a fourteenth aspect of the invention may be configured such that in the rolling bearing according to the twelfth aspect or the thirteenth aspect, the grease is not in contact with the extension portion.

According to the fourteenth aspect, when the sealing member is mounted, it is possible to provide a larger space for the grease pressed inward in the axial direction by the planar portion of the sealing member to spread in the radial direction toward the extension portion. Therefore, the grease can be prevented from spreading largely toward the one bearing ring side and the rolling body side. Thus, the grease can be easily prevented from coming into contact with the rolling body, a cage, and the one bearing ring more than necessary.

The rolling bearing according to a fifteenth aspect of the invention may be configured such that in the rolling bearing according to any one of the twelfth aspect to the fourteenth aspect, the bearing ring contact portion is provided with an interval in the axial direction with respect to a contact portion between the one bearing ring and the pedestal portion.

According to the fifteenth aspect, the grease can be prevented from coming into contact with the contact portion between the bearing ring and the pedestal portion. Accordingly, it is possible to prevent the grease from leaking to an outside of the sealing member through the contact portion between the bearing ring and the pedestal portion due to a capillary phenomenon.

The rolling bearing according to a sixteenth aspect of the invention may be configured such that in the rolling bearing according to any one of the twelfth aspect to the fifteenth aspect, the grease is not in contact with the pedestal portion.

According to the sixteenth aspect, the grease can be prevented from coming into contact with the contact portion between the bearing ring and the pedestal portion. Accordingly, it is possible to prevent the grease from leaking to the outside of the sealing member through the contact portion between the bearing ring and the pedestal portion due to the capillary phenomenon.

The rolling bearing according to a seventeenth aspect of the invention may be configured such that in the rolling bearing according to any one of the twelfth aspect to the sixteenth aspect, the one bearing ring has a protruding portion that protrudes toward the other bearing ring side and on which the raceway surface is formed, the protruding portion has an end surface that faces outward in the axial direction, is connected to the circumferential surface at a circumferential edge on the other bearing ring side, and is in contact with the pedestal portion, and the pedestal portion is disposed so as not to protrude further toward the other bearing ring side than the end surface when viewed from the axial direction.

According to the seventeenth aspect, even when the bearing ring contact portion of the grease spreads in the axial direction and goes over the circumferential edge of the end surface, it is possible to prevent the grease from adhering to the pedestal portion. Therefore, the grease can be prevented from coming into contact with the contact portion between the bearing ring and the pedestal portion. Accordingly, it is possible to prevent the grease from leaking to the outside of the sealing member through the contact portion between the bearing ring and the pedestal portion due to the capillary phenomenon.

A rotating device according to an eighteenth aspect of the invention includes: a rotating body disposed to be rotatable; a support body rotatably supporting the rotating body; and the rolling bearing according to any one of the first aspect to the seventeenth aspect interposed between the rotating body and the support body.

According to the eighteenth aspect, by including the rolling bearing that ensures durability and reduces rotational resistance, it is possible to achieve a long life of the rotating device and to achieve power saving of the rotating device by reduction in rotational resistance of the rotating body with respect to the support body.

A method for manufacturing a rolling bearing according to a nineteenth aspect of the invention is a method for manufacturing a rolling bearing, the rolling bearing including an inner ring and an outer ring disposed coaxially with each other, a rolling body disposed between the inner ring and the outer ring, a sealing member mounted on the inner ring or the outer ring and covering a space between the inner ring and the outer ring from an outer side in an axial direction, and grease disposed between the rolling body and the sealing member, one bearing ring of the inner ring and the outer ring having a circumferential surface facing the other bearing ring, and the circumferential surface being formed with a raceway surface that supports the rolling body in a rollable manner, and a recessed portion that is provided at a location extending in the axial direction from an end edge of the raceway surface in the axial direction and is recessed in a radial direction, and the method for manufacturing a rolling bearing includes: an application step of applying the grease by bringing the grease into contact with the recessed portion.

According to the nineteenth aspect, the grease can be applied to the one bearing ring so that the displacement in the axial direction is restricted by the recessed portion. Accordingly, it is possible to prevent the grease from being displaced and coming into contact with the rolling body or the like by a desired amount or more. Thus, the rotational resistance of the rolling bearing can be reduced. Further, since the grease can be disposed inside the recessed portion, a total amount of the grease can be increased as compared with a case where the grease is not applied to the recessed portion. As described above, it is possible to manufacture a rolling bearing capable of ensuring durability and reducing rotational resistance.

The method for manufacturing a rolling bearing according to a twentieth aspect of the invention may be configured such that in the method for manufacturing a rolling bearing according to the nineteenth aspect, the sealing member includes an annular pedestal portion that is in contact with the one bearing ring from the outer side in the axial direction, an extension portion that extends outward in the axial direction from a circumferential edge of the pedestal portion on the other bearing ring side of the inner ring and the outer ring, and a planar portion that extends along the radial direction from an end edge of the extension portion on the outer side in the axial direction toward the other bearing ring, in the application step, the grease is applied so as to protrude outward in the axial direction and toward the other bearing ring side from a contact portion with the one bearing ring, and the method for manufacturing a rolling bearing further includes: a contact step of bringing the sealing member close to the one bearing ring from the outer side in the axial direction and bringing the planar portion into contact with an end edge of the grease on the outer side in the axial direction; and after the contact step, a mounting step of bringing the sealing member close to the one bearing ring to bring the pedestal portion into contact with the one bearing ring from the outer side in the axial direction, and pressing the grease inward in the axial direction by the planar portion.

According to the twentieth aspect, since the planar portion of the sealing member comes into contact with the end edge of the grease on the outer side in the axial direction in the contact step, it is possible to provide a space for the grease to spread in the radial direction toward the extension portion and the pedestal portion of the sealing member in a process of being pressed inward in the axial direction by the planar portion in the mounting step. Therefore, the grease can be prevented from spreading largely toward the other bearing ring side and the rolling body side. Thus, the grease can be easily prevented from directly contacting the rolling body and the other bearing ring.

In addition, since the extension portion is provided between the planar portion and the pedestal portion, the grease is less likely to be pressed toward the rolling body side than in a configuration in which the planar portion extends from the pedestal portion toward the other bearing ring side. Thus, the grease can be disposed in advance to a position closer to the rolling body, and thus an amount of grease can be increased.

According to the invention, it is possible to provide the rolling bearing, the rotating device, and the method for manufacturing a rolling bearing, which can ensure durability and reduce rotational resistance.

BRIEF DESCRIPTION OF THE DRAWINGS

FIG. 5 is a longitudinal cross-sectional view of a rolling bearing according to a first modification of the first embodiment.

FIG. 6 is a longitudinal cross-sectional view of a rolling bearing according to a second modification of the first embodiment.

DESCRIPTION OF EMBODIMENTS

Hereinafter, embodiments of the invention will be described with reference to the drawings. In the following description, components having the same or similar functions are denoted by the same reference signs. Redundant description of the configuration may be omitted.

First Embodiment

A first embodiment of the invention will be described with reference to FIGS. 1 and 2.

Figure 1:
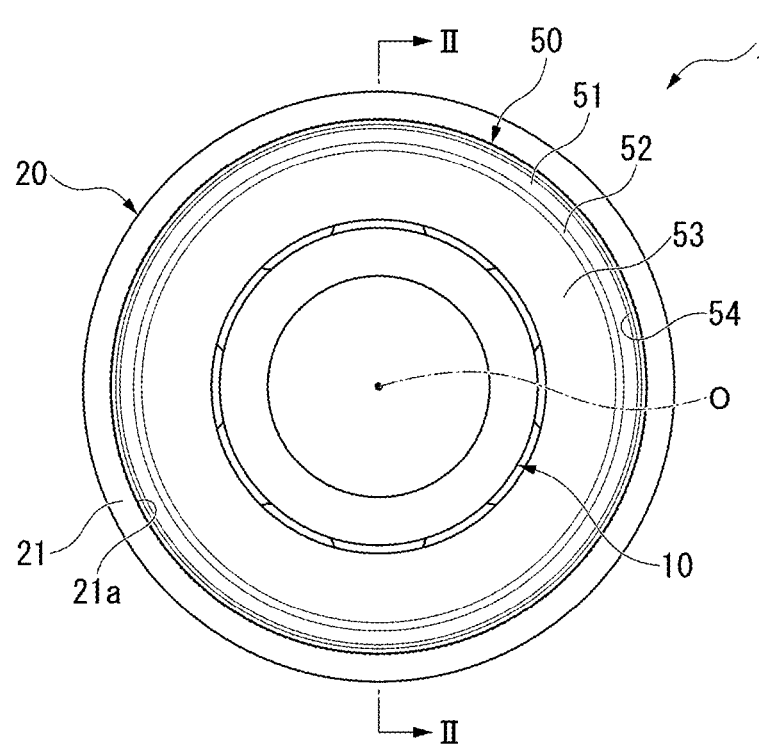
FIG. 1 is a plan view of a rolling bearing according to a first embodiment.

FIG. 1 is a plan view of a rolling bearing according to the first embodiment. FIG. 2 is a longitudinal cross-sectional view taken along line II-II in FIG. 1. In FIG. 2, a rotating device 2 on which a rolling bearing 1 is mounted is indicated by a virtual line.

Figure 2:
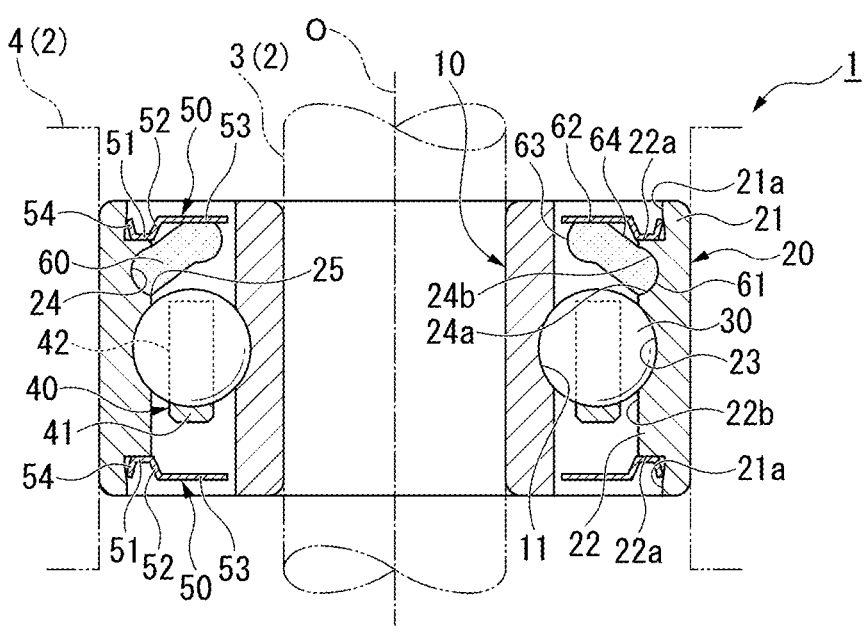
FIG. 2 is a longitudinal cross-sectional view taken along line II-II in FIG. 1.

As shown in FIGS. 1 and 2, the rolling bearing 1 is a radial ball bearing including an inner ring 10 and an outer ring 20 that are bearing rings, a plurality of rolling bodies 30, a cage 40, and a pair of sealing members 50. The rolling bearing 1 is provided in the rotating device 2 such as a fan motor. The rotating device 2 includes a shaft 3 (rotating body) that is rotatable about a common axis O, and a housing 4 (support body) fixedly disposed to rotatably support the shaft 3. The rolling bearing 1 is interposed between the shaft 3 and the housing 4.

The inner ring 10 and the outer ring 20 are disposed coaxially with each other such that their central axes coincide with the common axis O. In the present embodiment, a direction in which the common axis O extends is referred to as an axial direction, a direction orthogonal to the common axis O and extending radially from the common axis O is referred to as a radial direction, and a direction around the common axis O is referred to as a circumferential direction. One of directions parallel to the axial direction and oriented in opposite directions is defined as an upward direction, and the other is defined as a downward direction.

The inner ring 10 is provided as a rotating ring. The inner ring 10 is fitted onto the shaft 3 and fixed to the shaft 3. The outer ring 20 is provided as a fixed ring. The outer ring 20 is fitted into a recessed portion (or a through hole) of the housing 4 and is fixed to the housing 4. The outer ring 20 surrounds the inner ring 10 from an outside of the inner ring 10 in the radial direction in a state where an annular space is provided between the outer ring 20 and the inner ring 10. The plurality of rolling bodies 30 are disposed between the inner ring 10 and the outer ring 20, and are held by the cage 40 in a rollable manner. The cage 40 rotatably holds the rolling bodies 30 in a state where the plurality of rolling bodies 30 are disposed evenly in the circumferential direction. The sealing member 50 is mounted on the outer ring 20 and covers an annular space between the inner ring 10 and the outer ring 20 from an outside in the axial direction.

The outer ring 20 is formed into an annular shape with a metal material such as stainless steel or bearing steel. The outer ring 20 is not limited to being made of metal, and may be made of other materials. The outer ring 20 includes an outer ring body 21 having a width along the axial direction equal to a width of the inner ring 10 along the axial direction, and a protruding portion 22 protruding inward in the radial direction from the outer ring body 21 and extending throughout the circumferential direction. The protruding portion 22 is formed in a portion of the outer ring body 21 located at a center in the axial direction. A width of the protruding portion 22 in the axial direction is smaller than the width of the outer ring body 21 in the axial direction and larger than an outer diameter of the rolling body 30.

The protruding portion 22 includes a pair of end surfaces 22*a* facing outward in the axial direction and an inner circumferential surface 22*b* (circumferential surface) connecting inner circumferential edges of the pair of end surfaces 22*a*. The end surfaces 22*a* extend parallel to each other in the radial direction and circumferential direction. An outer ring raceway surface 23 recessed outward in the radial direction is formed on the inner circumferential surface 22*b*. The outer ring raceway surface 23 is formed in a hemispherical shape in a cross-sectional view along an outer surface of the rolling body 30, and is formed in an annular shape extending in the circumferential direction over an entire circumference of the inner circumferential surface 22*b*. The outer ring raceway surface 23 is formed in a portion of the inner circumferential surface 22*b* located at a center in the axial direction.

Further, a recessed portion 24 recessed outward in the radial direction is formed in the inner circumferential surface 22*b*. The recessed portion 24 is provided at a location of the inner circumferential surface 22*b* extending in the axial direction from an end edge of the outer ring raceway surface 23 in the axial direction. The recessed portion 24 is provided above the outer ring raceway surface 23. The recessed portion 24 is provided with an interval in the axial direction with respect to the outer ring raceway surface 23. The recessed portion 24 is provided with an interval in the axial direction with respect to the end surface 22*a* facing upward. The recessed portion 24 continuously extends throughout the circumferential direction. The recessed portion 24 extends in an arc shape on a longitudinal cross section of the rolling bearing 1. For example, on the longitudinal cross section of the rolling bearing 1, a radius of curvature of the recessed portion 24 may be equal to or different from a radius of curvature of the outer ring raceway surface 23. The recessed portion 24 may not extend at a constant curvature on the longitudinal cross section of the rolling bearing 1. The recessed portion 24 includes an outward facing surface 24*a* facing a direction inclined outward in the axial direction with respect to the radial direction (inward and upward in the radial direction, or upward), and an inward facing surface 24*b* facing a direction inclined inward in the axial direction with respect to the radial direction (inward and downward in the radial direction, or downward). A portion of the inner circumferential surface 22*b* excluding the outer ring raceway surface 23 and the recessed portion 24 extends in the axial direction with a constant inner diameter.

The inner circumferential surface 22*b* includes a ridge portion 25 formed at an end edge of the recessed portion 24 on the outer ring raceway surface 23 side (inner side in the axial direction). The ridge portion 25 may be rounded or pointed on the longitudinal cross section of the rolling bearing 1.

The outer ring body 21 has a pair of inner circumferential surfaces 21*a* extending from an outer circumferential edge of each end surface 22*a* of the protruding portion 22 to an opening edge of the outer ring 20. A portion of each inner circumferential surface 21*a* located on an inner side in the axial direction is located on an outer side in the radial direction relative to a portion located on an outer side in the axial direction.

The inner ring 10 is formed into an annular shape with a metal material such as stainless steel or bearing steel. The inner ring 10 is not limited to being made of metal, and may be made of other materials. An inner ring raceway surface 11 recessed inward in the radial direction is formed on an outer circumferential surface of the inner ring 10. The inner ring raceway surface 11 is formed in a hemispherical shape in the cross-sectional view along the outer surface of the rolling body 30, and is formed in an annular shape extending in the circumferential direction over an entire circumference of the outer circumferential surface. The inner ring raceway surface 11 is formed in a portion of the outer circumferential surface of the inner ring 10 located at a center in the axial direction, and faces the outer ring raceway surface 23 in the radial direction. A portion of the outer circumferential surface of the inner ring 10 excluding the inner ring raceway surface 11 extends in the axial direction with a constant outer diameter.

As shown in FIG. 2, the plurality of rolling bodies 30 are formed into a spherical shape with a metal material such as stainless steel or bearing steel. The plurality of rolling bodies 30 are disposed between the outer ring raceway surface 23 and the inner ring raceway surface 11, and are supported by the outer ring raceway surface 23 and the inner ring raceway surface 11 in a rollable manner. The plurality of rolling bodies 30 are maintained at intervals in the circumferential direction by the cage 40.

The cage 40 is formed into an annular shape as a whole with a synthetic resin or a metal material. The cage 40 is disposed around the common axis O. The cage 40 includes an annular portion 41 formed in an annular shape and disposed below the plurality of rolling bodies 30, and a plurality of column portions 42 protruding upward from the annular portion 41 and provided at intervals in the circumferential direction. The column portions 42 are disposed evenly in the circumferential direction. A pair of column portions 42 adjacent to each other in the circumferential direction form a ball pocket therebetween. The ball pocket penetrates through the cage 40 in the radial direction, and opens upward at an upper end surface of the cage 40. The ball pockets are provided corresponding to the number of the rolling bodies 30, and hold the rolling bodies 30 in a rollable manner individually. Accordingly, the cage 40 arranges the rolling bodies 30 evenly at intervals in the circumferential direction. The cage 40 is disposed with a gap from the inner ring 10 and the outer ring 20 so as not to interfere with the inner ring 10 and the outer ring 20. In the present embodiment, the entire cage 40 is located on the inner side in the axial direction relative to the pair of end surfaces 22a of the protruding portion 22 of the outer ring 20.

As shown in FIGS. 1 and 2, the sealing member 50 is formed in an annular plate shape. The sealing member 50 is disposed around the common axis O. The sealing member 50 is uniformly formed over the entire circumference. The sealing member 50 is fitted into the outer ring 20 from the outside in the axial direction. One sealing members 50 is disposed on each of both sides of the plurality of rolling bodies 30 in the axial direction. The sealing member 50 includes an annular pedestal portion 51 that comes into contact with the outer ring 20 from the outside in the axial direction, an extension portion 52 that extends outward in the axial direction from an inner circumferential edge of the pedestal portion 51, a planar portion 53 that extends along the radial direction from an end edge of the extension portion 52 on the outer side in the axial direction toward the inner ring 10, and a locking portion 54 that extends outward in the radial direction and outward in the axial direction from an outer circumferential edge of the pedestal portion 51.

As shown in FIG. 2, the pedestal portion 51 overlaps the end surface 22a of the protruding portion 22 of the outer ring 20 from the outside in the axial direction. The pedestal portion 51 extends substantially parallel to the end surface 22a of the protruding portion 22 of the outer ring 20. The pedestal portion 51 protrudes inward in the radial direction from the end surface 22a of the protruding portion 22 in a plan view viewed from the axial direction. A distance by which the pedestal portion 51 protrudes inward in the radial direction from the end surface 22a of the protruding portion 22 is 10% or less, and preferably 5% or less, of an interval between the inner ring 10 and the outer ring 20 in the radial direction. The extension portion 52 extends outward in the axial direction and inward in the radial direction from the inner circumferential edge of the pedestal portion 51. The planar portion 53 overlaps a center of the rolling body 30 in the plan view. An inner circumferential edge of the planar portion 53 is disposed at the outer circumferential surface of the inner ring 10 with a gap therebetween. A surface of the planar portion 53 facing inward in the axial direction is a flat surface extending in the circumferential direction and the radial direction. An outer circumferential edge of the locking portion 54 is locked to the inner circumferential surface 21a of the outer ring body 21 from an inner side in the axial direction. Accordingly, the sealing member 50 is fixed to the outer ring 20 and rotates integrally with the outer ring 20 with respect to the inner ring 10.

The rolling bearing 1 is enclosed with grease 60. The grease 60 is disposed between the rolling body 30 and the sealing member 50. The grease 60 is disposed on the same side in the annular space between the inner ring 10 and the outer ring 20 as the recessed portion 24 facing the rolling body 30 in the axial direction. In the present embodiment, the grease 60 is disposed on an opposite side of the annular portion 41 of the cage 40 across the rolling body 30 in the axial direction. The grease 60 is disposed above the rolling body 30. The grease 60 is disposed along the circumferential direction. The grease 60 extends in an annular shape or an arc shape, and is disposed coaxially with the common axis O.

The grease 60 includes an outer ring contact portion 61 (bearing ring contact portion) that is in contact with the inner circumferential surface 22b of the protruding portion 22 of the outer ring 20, and a sealing member contact portion 62 that is in contact with the planar portion 53 of the sealing member 50 on the outer side in the axial direction and an inner side in the radial direction relative to the outer ring contact portion 61. The outer ring contact portion 61 and the sealing member contact portion 62 extend in the circumferential direction over an entire length of the grease 60. The outer ring contact portion 61 has a width in the axial direction throughout the circumferential direction. The outer ring contact portion 61 is in contact with the recessed portion 24 of the inner circumferential surface 22b of the protruding portion 22. The outer ring contact portion 61 is in contact with the recessed portion 24 over an entire circumference. The outer ring contact portion 61 is in contact with the outward facing surface 24a of the recessed portion 24. In this case, the outer ring contact portion 61 is preferably in contact with at least a part of the ridge portion 25 of the inner circumferential surface 22b. Further, the outer ring contact portion 61 is in contact with the inward facing surface 24b of the recessed portion 24 and a location of the recessed portion 24 facing inward in the radial direction. In the present embodiment, the outer ring contact portion 61 is in contact with the entire recessed portion 24. The grease 60 is preferably not in contact with a location of the outer ring 20 other than the recessed portion 24. That is, the outer ring contact portion 61 is provided with an interval in the axial direction with respect to a contact portion between the outer ring 20 and the pedestal portion 51 of the sealing member 50. The sealing member contact portion 62 has a width in the radial direction throughout the circumferential direction. The sealing member contact portion 62 is in contact with the planar portion 53 at a location with an interval in the radial direction from a connection portion between the extension portion 52 and the planar portion 53 of the sealing member 50.

The grease 60 extends outward in the axial direction and inward in the radial direction from the outer ring contact portion 61 toward the sealing member contact portion 62. The grease 60 includes an inner surface 63 and an outer surface 64.

The inner surface 63 connects an end edge of the outer ring contact portion 61 on the inner side in the axial direction and an end edge of the sealing member contact portion 62 on the inner side in the radial direction. The inner surface 63 faces the outer circumferential surface of the inner ring 10 and the rolling body 30. An upper half portion of the inner surface 63 extends inward in the axial direction and inward in the radial direction from the end edge of the sealing member contact portion 62 on the inner side in the radial direction. A lower half portion of the inner surface 63 extends outward in the axial direction and inward in the radial direction from the end edge of the outer ring contact portion 61 on the inner side in the axial direction and is connected to a lower end edge of the upper half portion. A boundary portion between the upper half portion and the lower half portion of the inner surface 63 forms an inner circumferential edge located on the innermost side of the grease 60 in the radial direction. The inner surface 63 is separated from the inner ring 10, the rolling body 30, and the cage 40. Accordingly, the grease 60 does not come into contact with the inner ring 10, the rolling body 30, and the cage 40.

The outer surface 64 connects an end edge of the outer ring contact portion 61 on the outer side in the axial direction and an end edge of the sealing member contact portion 62 on the outer side in the radial direction. The outer surface 64 faces the inner circumferential surface 22b of the protruding portion 22 of the outer ring 20 and the sealing member 50. The outer surface 64 extends inward in the axial direction and outward in the radial direction from the end edge of the sealing member contact portion 62 on the outer side in the radial direction, and is connected to the end edge of the outer ring contact portion 61 on the outer side in the axial direction. The outer surface 64 is separated from the pedestal portion 51 and the extension portion 52 of the sealing member 50. Accordingly, the grease 60 does not come into contact with the pedestal portion 51 and the extension portion 52 of the sealing member 50 located closer to an outer ring 20 side than the planar portion 53.

The grease 60 is formed such that a cross-sectional area of a cross section along a vertical plane of the common axis O gradually increases from an end portion on the outer side in the axial direction toward the inner side in the axial direction. In the present embodiment, the grease 60 is formed such that the cross-sectional area of the cross section along the vertical plane of the common axis O gradually increases from the end portion on the outer side in the axial direction toward the inner side in the axial direction, in a portion corresponding to the upper half portion of the inner surface 63.

The grease 60 may be in contact with at least one of the rolling body 30 and the cage 40. For example, the grease 60 may come into contact with at least one of the rolling body 30 and the cage 40 from an initial state in which the grease 60 is not in contact with the rolling body 30 and the cage 40 due to a change over time.

Next, a method for manufacturing the rolling bearing 1 according to the present embodiment will be described.

The method for manufacturing the rolling bearing 1 according to the present embodiment includes an application step and a sealing step.

Figure 3:
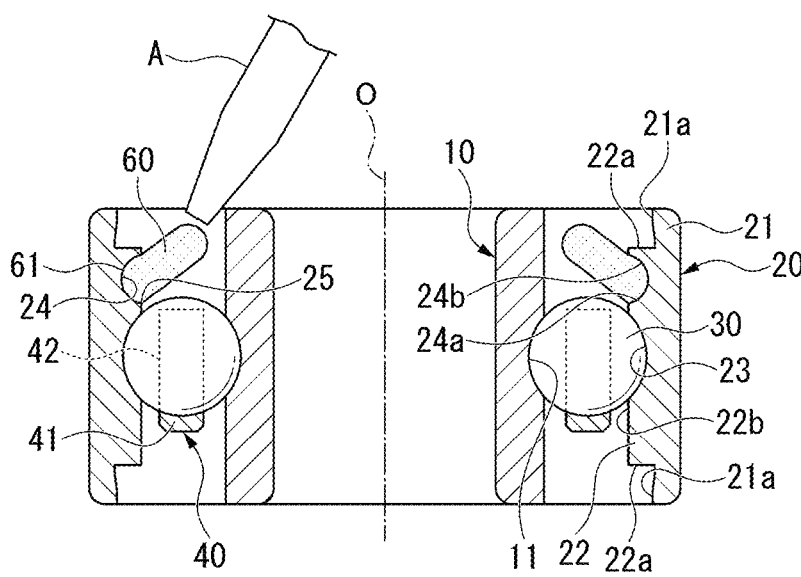
FIG. 3 is a longitudinal cross-sectional view of the rolling bearing for showing a grease application method according to the first embodiment.
Figure 4:
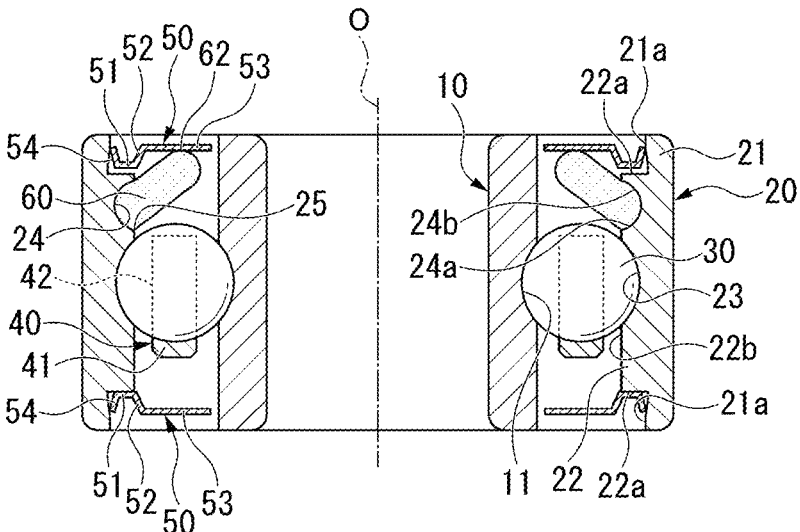
FIG. 4 is a longitudinal cross-sectional view of the rolling bearing for showing the grease application method according to the first embodiment.

FIGS. 3 and 4 are longitudinal cross-sectional views of the rolling bearing for showing a grease application method according to the first embodiment.

As shown in FIG. 3, the application step is performed in a state where the sealing member 50 is not attached to the outer ring 20. That is, the grease 60 is applied in a state where the annular space between the inner ring 10 and the outer ring 20 is opened in the axial direction and the rolling body 30 and the cage 40 are exposed. In the application step, the grease 60 is discharged from a nozzle A while the nozzle A is rotated about the common axis O with respect to the outer ring 20. At this time, an orientation of the nozzle A is adjusted so that the grease 60 is discharged from the nozzle A to the outer side in the radial direction and the inner side in the axial direction. Further, the discharged grease 60 is brought into contact with the recessed portion 24 of the inner circumferential surface 22b of the protruding portion 22 of the outer ring 20, and a position of the nozzle A is adjusted so that the grease 60 does not come into contact with the rolling body 30 and the cage 40. By discharging the grease 60 while rotating the nozzle A relative to the outer ring 20, the grease 60 applied to the outer ring 20 extends in a circumferential shape or an arc shape. The grease 60 is applied along a discharge direction from the nozzle A so as to project outward in the axial direction and inward in the radial direction from the contact portion with the outer ring 20. An outer end surface of the applied grease 60 in the axial direction is formed in a projecting manner bulging outward in the axial direction.

Subsequently, the sealing step is performed. As shown in FIG. 4, in the sealing step, the sealing member 50 is mounted on the outer ring 20 by bringing the sealing member 50 closer to the outer ring 20 from the outer side in the axial direction. In a process of displacing the sealing member 50 inward in the axial direction, before the pedestal portion 51 comes into contact with the end surface 22a of the protruding portion 22 of the outer ring 20, the planar portion 53 of the sealing member 50 is first brought into contact with an end edge of the entire grease 60 on the outer side in the axial direction (contact step). At this time, the grease 60 is brought into contact with an intermediate portion of the planar portion 53 in the radial direction. The intermediate portion in the radial direction may be located inward in the radial direction relative to an outer circumferential edge of the planar portion 53 and outward in the radial direction relative to an inner circumferential edge of the planar portion 53. Thereafter, the sealing member 50 is further brought close to the outer ring 20 to bring the pedestal portion 51 into contact with the end surface 22a of the protruding portion 22 of the outer ring 20 from the outer side in the axial direction (mounting step). At this time, the grease 60 is pressed inward in the axial direction by the planar portion 53 of the sealing member 50. Accordingly, the grease 60 spreads in the radial direction by being pressed by the planar portion 53, and the sealing member contact portion 62 of the grease 60 is formed.

As described above, the rolling bearing 1 is formed. In the application step according to the present embodiment, the grease 60 is applied while the nozzle A is rotated with respect to the outer ring 20. However, the grease may be discharged from a nozzle having a discharge hole extending in the circumferential direction, and the grease may be collectively applied in a circumferential shape or an arc shape.

As described above, in the present embodiment, the rolling bearing 1 has the following configuration. The inner circumferential surface 22b of the protruding portion 22 of the outer ring 20 is formed with the outer ring raceway surface 23 that supports the rolling body 30 in a rollable manner, and the recessed portion 24 that is provided at a location extending in the axial direction from the end edge of the outer ring raceway surface 23 in the axial direction and is recessed in the radial direction. The grease 60 is in contact with the recessed portion 24. According to this configuration, displacement of the grease 60 in the axial direction can be restricted by the recessed portion 24. Accordingly, it is possible to prevent the grease 60 from being displaced and coming into contact with the rolling body 30 or the cage 40 by a desired amount or more. Thus, rotational resistance of the rolling bearing 1 can be reduced. Further, since the grease 60 can be disposed inside the recessed portion 24, a total amount of the grease 60 can be increased as compared with a configuration in which the recessed portion is not formed. As described above, it is possible to provide the rolling bearing 1 capable of ensuring durability and reducing rotational resistance.

The grease 60 is in contact with the outward facing surface 24*a* of the recessed portion 24 that is inclined outward in the axial direction with respect to the radial direction. According to this configuration, the outward facing surface 24*a* of the recessed portion 24 restricts the grease 60 from being displaced inward in the axial direction from the initial state. Accordingly, since the grease 60 is less likely to be displaced inward in the axial direction from an initial position in a process of repeated use of the rolling bearing 1, it is possible to increase an amount of the grease 60 to be enclosed, and it is possible to obtain the above-described operation and effect more reliably.

Further, since the grease 60 is in contact with the outward facing surface 24*a* of the recessed portion 24, a shape and position of the grease 60 are less likely to change due to vibration during transportation or storage for a long period (particularly, storage in a high-temperature environment). Therefore, it is possible to provide the rolling bearing 1 in which a fluctuation in the rotational resistance from an initial stage of manufacturing is reduced.

The recessed portion 24 has the inward facing surface 24*b* that is inclined inward in the axial direction with respect to the radial direction. According to this configuration, the inward facing surface 24*b* of the recessed portion 24 restricts the grease 60 from being displaced outward in the axial direction. Accordingly, it is possible to prevent the grease 60 or base oil of the grease 60 from flowing out to a sealing member 50 side and leaking from a gap between the sealing member 50 and the outer ring 20.

The grease 60 is in contact with the sealing member 50. According to this configuration, when the sealing member 50 is mounted on the outer ring 20 in a state where the grease 60 is applied to the outer ring 20, even when the grease 60 in contact with the sealing member 50 is pressed inward in the axial direction by the sealing member 50, the grease 60 is restricted, by the recessed portion 24, from being displaced inward in the axial direction as described above. Therefore, it is possible to prevent the grease 60 from coming into contact with the rolling body 30 or the cage 40 by a desired amount or more. Therefore, the rotational resistance of the rolling bearing 1 can be reduced.

In particular, in the present embodiment, since the grease 60 is in contact with the outward facing surface 24*a* of the recessed portion 24, the grease 60 is supported by the sealing member 50 in addition to the recessed portion 24. Therefore, the shape and position of the grease 60 are less likely to change due to vibration during transportation or storage for a long period (particularly, storage in a high-temperature environment). Therefore, it is possible to provide the rolling bearing 1 in which a fluctuation in the rotational resistance from the initial stage of manufacturing is reduced.

In addition, since the grease 60 is in contact with the extension portion 52 and the planar portion 53 of the sealing member 50, an effect of reducing a change in the shape and position of the grease 60 is easily achieved. Since an amount of the grease 60 can be increased, higher durability can be provided to the rolling bearing 1. The grease 60 is in contact with at least one of the extension portion 52 and the planar portion 53 of the sealing member 50, so that the above-described effect is achieved. More preferably, the grease 60 is in contact with the planar portion 53.

The recessed portion 24 is provided with an interval in the axial direction with respect to the outer ring raceway surface 23. According to this configuration, the grease 60 in the recessed portion 24 can be prevented from coming into contact with the rolling body 30 that rolls on the outer ring raceway surface 23. Accordingly, it is possible to reduce an increase in rotational resistance of the rolling bearing 1.

The recessed portion 24 is provided with an interval in the axial direction with respect to the end surface 22*a* of the protruding portion 22. According to this configuration, it is possible to prevent the grease 60 or the base oil of the grease 60 from flowing out from the recessed portion 24 to an end surface 22*a* side and leaking from the gap between the end surface 22*a* and the pedestal portion 51 of the sealing member 50.

The recessed portion 24 continuously extends throughout the circumferential direction. According to this configuration, the grease 60 disposed along the circumferential direction is less likely to be, by the recessed portion 24, displaced in the axial direction over the entire length of the grease 60. Thus, the rotational resistance of the rolling bearing 1 can be reduced. Further, compared with a configuration in which the recessed portion 24 is formed discontinuously in the circumferential direction, an amount of the grease 60 disposed inside the recessed portion 24 can be increased.

The grease 60 is in contact with the ridge portion 25 formed at the end edge of the recessed portion 24 on the outer ring raceway surface 23 side. According to this configuration, it is not necessary for the base oil oozing from the grease 60 to go over the ridge portion 25 in a process of reaching the outer ring raceway surface 23, and an insufficient supply of the base oil of the grease 60 to the rolling body 30 can be prevented.

The grease 60 includes the outer ring contact portion 61 that is in contact with the inner circumferential surface 22*b* of the protruding portion 22 of the outer ring 20, and the sealing member contact portion 62 that is in contact with the planar portion 53 of the sealing member 50 on the outer side in the axial direction and the inner side in the radial direction relative to the outer ring contact portion 61. An area of the sealing member contact portion 62 is larger than a contact area of the grease 60 with the extension portion 52 and the pedestal portion 51 of the sealing member 50. According to this configuration, when the sealing member 50 is mounted after the grease 60 is applied to a predetermined location, it is possible to provide a space for the grease 60 pressed inward in the axial direction by the planar portion 53 of the sealing member 50 to spread in the radial direction toward the extension portion 52 and the pedestal portion 51. Therefore, the grease 60 can be prevented from spreading largely toward the inner ring 10 side and a rolling body 30 side. Thus, the grease 60 can be easily prevented from directly contacting the rolling body 30 and the cage 40.

In addition, since the extension portion 52 is provided between the planar portion 53 and the pedestal portion 51 in the sealing member 50, the grease 60 can be disposed at a position further away from the rolling body 30 than in a configuration in which the planar portion extends inward in the radial direction from the pedestal portion. Thus, an amount of the grease 60 can be increased.

As described above, it is possible to provide the rolling bearing 1 capable of ensuring durability and reducing rotational resistance.

The sealing member contact portion 62 includes a center position of the grease 60 in the radial direction in the plan view. According to this configuration, when the sealing member 50 is mounted, the grease 60 spreads in the radial direction by being pressed by the planar portion 53, and as a result, since the sealing member contact portion 62 including the center position of the grease 60 in the radial direction in the plan view, it is possible to prevent the grease 60 from spreading largely inward in the axial direction toward the rolling body 30. Thus, the grease 60 can be easily prevented from directly contacting the rolling body 30.

The grease 60 is not in contact with the extension portion 52. According to this configuration, when the sealing member 50 is mounted, it is possible to provide a larger space for the grease 60 pressed inward in the axial direction by the planar portion 53 of the sealing member 50 to spread in the radial direction toward the extension portion 52. Therefore, the grease 60 can be prevented from spreading largely toward the inner ring 10 side and the rolling body 30 side. Thus, the grease 60 can be easily prevented from coming into contact with the rolling body 30, the cage 40, and the inner ring 10 more than necessary.

The outer ring contact portion 61 is provided with an interval in the axial direction with respect to the contact portion between the outer ring 20 and the pedestal portion 51. According to this configuration, the grease 60 can be prevented from coming into contact with the contact portion between the outer ring 20 and the pedestal portion 51. Accordingly, it is possible to prevent the grease 60 from leaking to an outside of the sealing member 50 through the contact portion between the outer ring 20 and the pedestal portion 51 due to a capillary phenomenon.

The grease 60 is not in contact with the pedestal portion 51. According to this configuration, the grease 60 can be prevented from coming into contact with the contact portion between the outer ring 20 and the pedestal portion 51. Accordingly, it is possible to prevent the grease 60 from leaking to the outside of the sealing member 50 through the contact portion between the outer ring 20 and the pedestal portion 51 due to the capillary phenomenon.

According to the rotating device 2 in the present embodiment, by including the rolling bearing 1 that ensures durability and reduces rotational resistance, it is possible to achieve a long life of the rotating device 2 and to achieve power saving of the rotating device 2 by reduction in rotational resistance of the shaft 3 with respect to the housing 4.

Figures 5, 6:
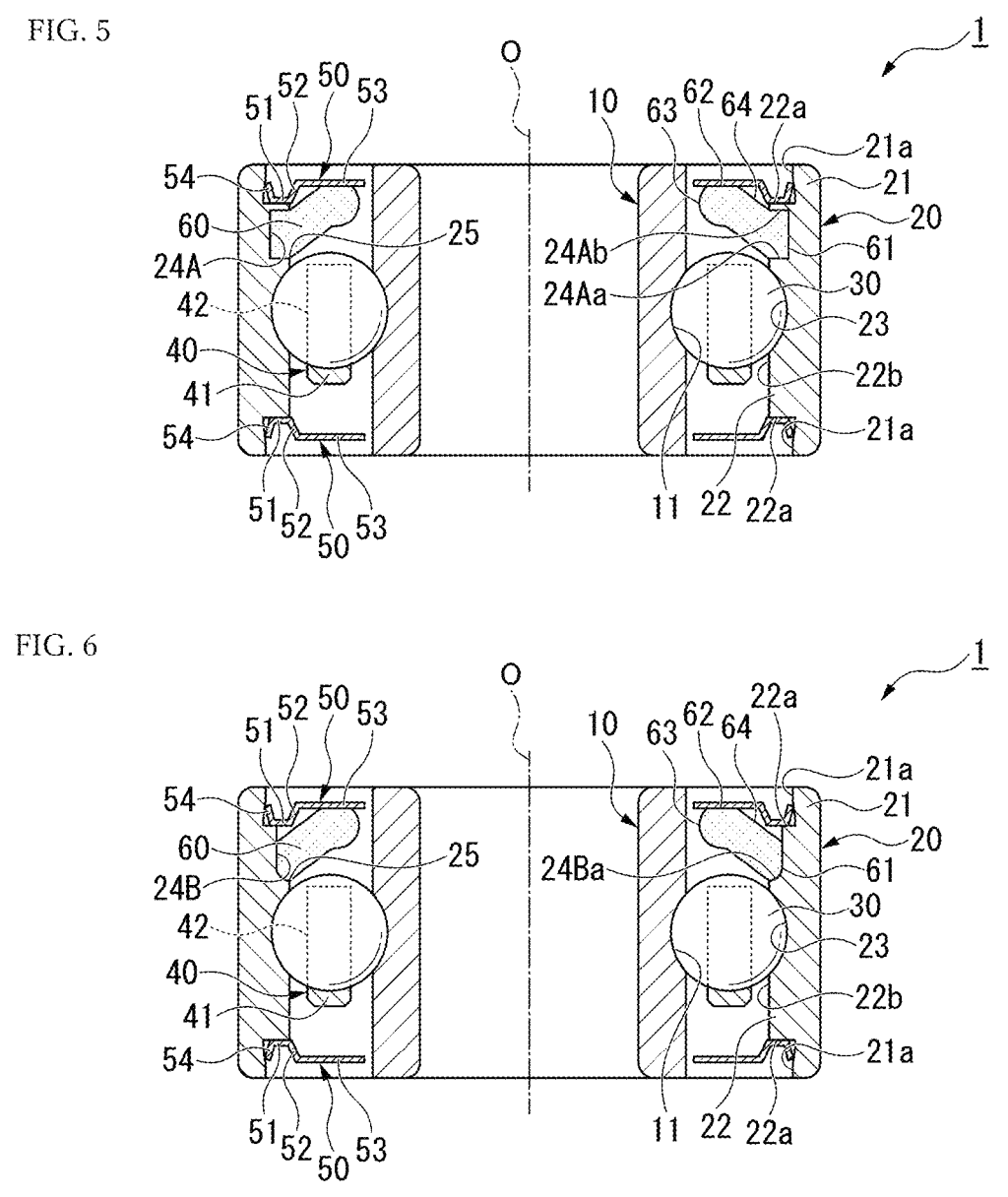

In the first embodiment, the recessed portion 24 extends in a curved shape on the longitudinal cross section of the rolling bearing 1, but the invention is not limited to this configuration. As shown in FIG. 5, a recessed portion 24A may define a rectangular space on the longitudinal cross section of the rolling bearing 1. In this case, the recessed portion 24A is provided with an outward facing surface 24Aa facing a direction inclined outward in the axial direction with respect to the radial direction (inward and upward in the radial direction, or upward), and an inward facing surface 24Ab facing a direction inclined inward in the axial direction with respect to the radial direction (inward and downward in the radial direction, or downward). The grease 60 is preferably in contact with the outward facing surface 24Aa of the recessed portion 24A and the ridge portion 25 of the inner circumferential surface 22b.

In the first embodiment, the recessed portion 24 opens only in the inner circumferential surface 22b, but the invention is not limited to this configuration. As shown in FIG. 6, a recessed portion 24B may be provided without an interval in the axial direction with respect to the end surface 22a facing upward, and may be open to the inner circumferential surface 22b and the end surface 22a facing upward. In this case, the recessed portion 24B is provided with an outward facing surface 24Ba facing a direction inclined outward in the axial direction with respect to the radial direction (inward and upward in the radial direction, or upward). The grease 60 is preferably in contact with the outward facing surface 24Ba of the recessed portion 24B and the ridge portion 25 of the inner circumferential surface 22b.

In the first embodiment, the recessed portion 24 continuously extends throughout the circumferential direction, but the invention is not limited to this configuration. The recessed portion may be formed discontinuously in the circumferential direction so that an intermittent portion is formed in at least a portion of the circumferential direction.

In the first embodiment, the pedestal portion 51 of the sealing member 50 protrudes inward in the radial direction from the end surface 22a of the protruding portion 22 of the outer ring 20 in the plan view. However, the pedestal portion is preferably disposed so as not to protrude further inward in the radial direction than the end surface 22a of the protruding portion 22 in the plan view. According to this configuration, even when the outer ring contact portion 61 of the grease 60 spreads outward in the axial direction and goes over the inner circumferential edge of the end surface 22a, it is possible to prevent the grease 60 from adhering to the pedestal portion. Therefore, the grease 60 can be prevented from coming into contact with the contact portion between the outer ring 20 and the pedestal portion. Accordingly, it is possible to prevent the grease 60 from leaking to the outside of the sealing member through the contact portion between the outer ring 20 and the pedestal portion due to the capillary phenomenon.

As a method for fixing the sealing member 50, in addition to a method for press-fitting and fixing the sealing member 50 to the bearing ring (outer ring 20) as in the present embodiment, there is also a method for fixing the bearing ring from the outer side in the axial direction by a stop ring such as a C-ring, but in this case, a position of the sealing member 50 is closer to the inner side in the axial direction, which is not preferable. By press-fitting and fixing the sealing member 50, the sealing member 50 can be disposed further outward in the axial direction, and an amount of the grease 60 can be increased. Since the recessed portion 24 can be provided on the outer side in the axial direction, even when the grease 60 is applied to the recessed portion 24, the grease 60 is less likely to be caught in the rolling body 30 or the raceway surface, and the rotational resistance of the rolling bearing can be reduced.

Second Embodiment

Next, a second embodiment will be described with reference to FIG. 7. The second embodiment is different from the first embodiment in that a rolling bearing 1A includes grease 160 instead of the grease 60 in the first embodiment. Configurations other than those to be described below are similar as those of the first embodiment.

Figure 7:
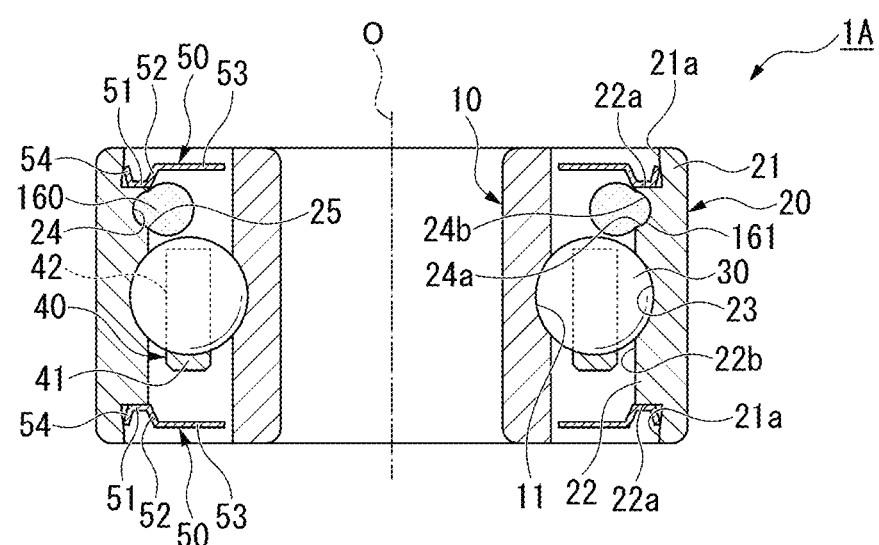
FIG. 7 is a longitudinal cross-sectional view of a rolling bearing according to a second embodiment.

FIG. 7 is a longitudinal cross-sectional view of the rolling bearing according to the second embodiment.

As shown in FIG. 7, the grease 160 is disposed along the circumferential direction. The grease 160 extends in an annular shape and is disposed coaxially with the common axis O. The grease 160 includes an outer ring contact portion 161 that is in contact with the inner circumferential surface 22b of the protruding portion 22 of the outer ring 20, and is not in contact with the inner ring 10, the sealing member 50, the rolling body 30, and the cage 40. The outer ring contact portion 161 extends in the circumferential direction over an entire length of the grease 160. The outer ring contact portion 161 has a width in the axial direction throughout the circumferential direction. The outer ring contact portion 161 is in contact with the recessed portion 24 of the inner circumferential surface 22b of the protruding portion 22. The grease 160 is preferably not in contact with a location of the outer ring 20 other than the recessed portion 24. That is, the outer ring contact portion 161 is provided with an interval in the axial direction with respect to the contact portion between the outer ring 20 and the pedestal portion 51 of the sealing member 50.

In the present embodiment, a similar effect as that of the first embodiment is achieved. In addition, in the present embodiment, since the grease 160 is not in contact with the sealing member 50, the grease 160 is not pressed by the sealing member 50 when the sealing member 50 is mounted on the outer ring 20. Accordingly, it is possible to prevent the grease 160 from moving inward in the axial direction and to prevent the grease 160 from coming into contact with the rolling body 30 or the cage 40 more than necessary. Therefore, an increase in rotational resistance of the rolling bearing 1A can be reduced.

In the second embodiment, the grease 160 extends in an annular shape, but the invention is not limited to this configuration. The grease may extend in an arc shape so as to form an intermittent portion, or may include a plurality of particles disposed in a dot shape over an entire circumference. When the grease has a plurality of particles, the plurality of particles aligned in the circumferential direction may be integrated or separated from each other.

Third Embodiment

Next, a third embodiment will be described with reference to FIG. 8. A rolling bearing 1B according to the third embodiment is different from the rolling bearing 1A according to the second embodiment in that grease 160A is in contact with the sealing member 50 and the rolling body 30. Configurations other than those to be described below are similar as those of the second embodiment.

Figure 8:
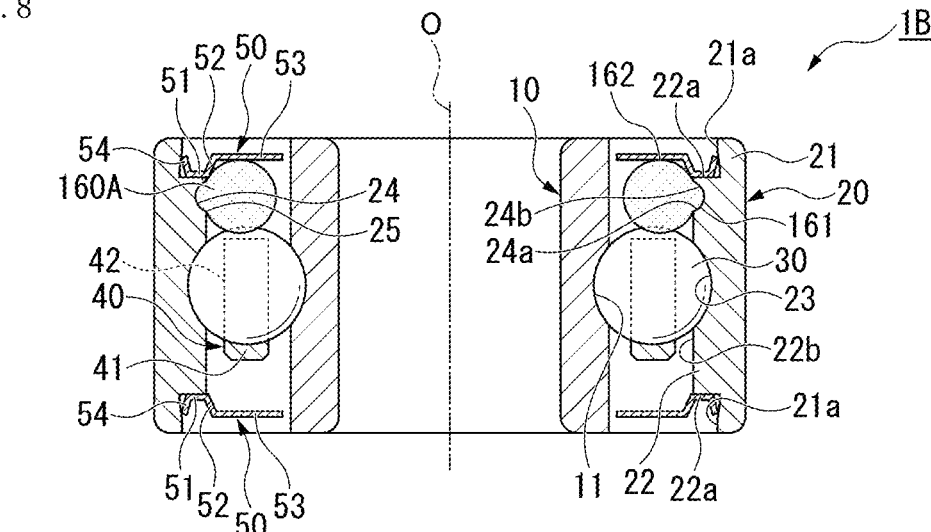
FIG. 8 is a longitudinal cross-sectional view of a rolling bearing according to a third embodiment.

FIG. 8 is a longitudinal cross-sectional view of the rolling bearing according to the third embodiment.

As shown in FIG. 8, the grease 160A further includes a sealing member contact portion 162 that is in contact with the planar portion 53 of the sealing member 50 on the outer side in the axial direction and the inner side in the radial direction relative to the outer ring contact portion 161, and is not in contact with the inner ring 10. The sealing member contact portion 162 is in contact with only the planar portion 53 of the sealing member 50. Accordingly, the grease 160A does not come into contact with the pedestal portion 51 and the extension portion 52 of the sealing member 50 located closer to an outer ring 20 side than the planar portion 53. The grease 160A is in contact with the rolling body 30. A volume of a portion of the grease 160A that is in contact with the rolling body 30 is half or less of a volume of the entire grease 160A. The grease 160A may be in contact with the cage 40.

In the present embodiment, a similar effect as that of the second embodiment is achieved. In addition, in the present embodiment, since the grease 160A is in contact with the rolling body 30, base oil of the grease 160A can be directly supplied to the rolling body 30. Therefore, an increase in rotational resistance of the rolling bearing 1B can be reduced.

In the third embodiment, as in the first embodiment, the grease 160A is prevented from spreading largely toward the inner ring 10 side and the rolling body 30 side when the sealing member 50 is mounted. Therefore, even when the grease 160A is in contact with the rolling body 30, a contact portion can be sufficiently reduced compared with a structure in the related art, and an effect of reducing the rotational resistance can be obtained.

In the third embodiment, the grease 160A extends in an annular shape, but the invention is not limited to this configuration. The grease may extend in an arc shape so as to form an intermittent portion, or may include a plurality of particles disposed in a dot shape over an entire circumference. When the grease has a plurality of particles, the plurality of particles aligned in the circumferential direction may be integrated or separated from each other.

Fourth Embodiment

Next, a fourth embodiment will be described with reference to FIG. 9. A rolling bearing 1C according to the fourth embodiment is different from the rolling bearing 1 according to the first embodiment in that grease 260 is in contact with only an outward facing surface 24Ca of a recessed portion 24C. Configurations other than those to be described below are similar as those of the first embodiment.

Figure 9:
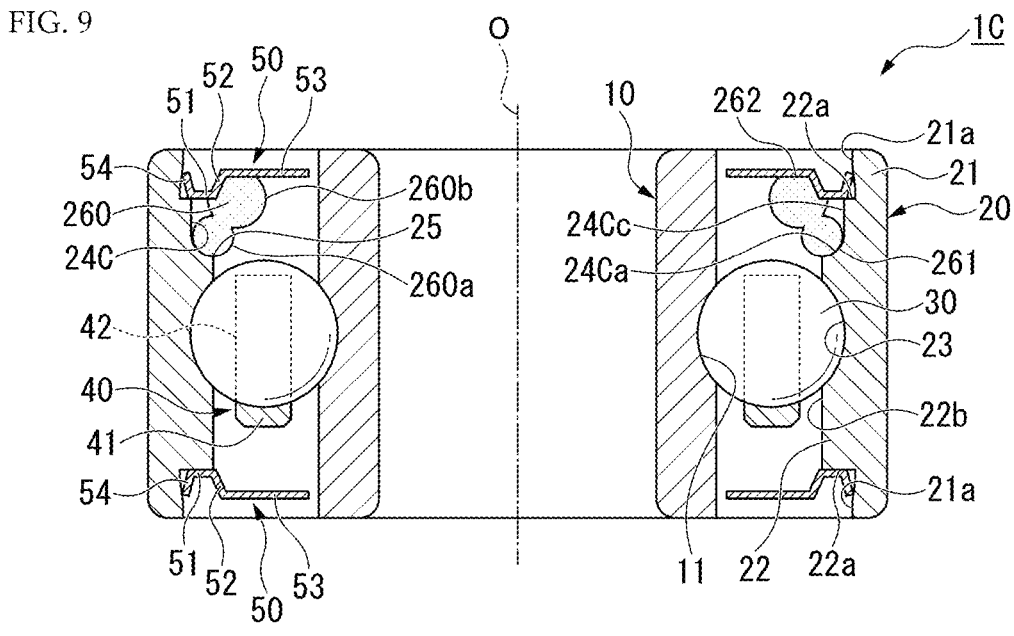
FIG. 9 is a longitudinal cross-sectional view of a rolling bearing according to a fourth embodiment.

FIG. 9 is a longitudinal cross-sectional view of the rolling bearing according to the fourth embodiment.

As shown in FIG. 9, the recessed portion 24C recessed outward in the radial direction is formed in the inner circumferential surface 22b of the protruding portion 22 of the outer ring 20. The recessed portion 24C is provided without an interval in the axial direction with respect to the end surface 22a of the protruding portion 22 facing upward, and is open to the inner circumferential surface 22b and the end surface 22a facing upward. The recessed portion 24C includes the outward facing surface 24Ca facing a direction inclined outward in the axial direction with respect to the radial direction (inward and upward in the radial direction, or upward), and a cylindrical surface 24Cc facing inward in the radial direction. The outward facing surface 24Ca is a recessed curved surface. The cylindrical surface 24Cc extends in the axial direction and is smoothly connected to the outward facing surface 24Ca at an end edge on the inner side in the axial direction such that a tangent line with respect to the outward facing surface 24Ca is continuous.

The grease 260 includes an outer ring contact portion 261 (bearing ring contact portion) that is in contact with the inner circumferential surface 22b of the protruding portion 22 of the outer ring 20, and a sealing member contact portion 262 that is in contact with the sealing member 50 on the outer side in the axial direction and the inner side in the radial direction relative to the outer ring contact portion 261. The outer ring contact portion 261 is in contact with the recessed portion 24C of the inner circumferential surface 22b of the protruding portion 22. The outer ring contact portion 261 is in contact with the recessed portion 24C over an entire circumference. The outer ring contact portion 261 is in contact with only the outward facing surface 24Ca of the recessed portion 24C. In this case, the outer ring contact portion 261 is preferably in contact with at least a part of the ridge portion 25 of the inner circumferential surface 22b. The outer ring contact portion 261 may not be in contact with the ridge portion 25 of the inner circumferential surface 22b. In the present embodiment, the sealing member contact portion 262 is a location of the grease 260 that is in contact with the planar portion 53 of the sealing member 50. In the present embodiment, the grease 260 is also in contact with the pedestal portion 51 and the extension portion 52 of the sealing member 50. When the grease 260 is in contact with at least one of the pedestal portion 51 and the extension portion 52 of the sealing member 50, an area of the sealing member contact portion 262 is preferably larger than a contact area between the grease 260 and the extension portion 52 and the pedestal portion 51. The grease 260 may be in non-contact with at least one of the pedestal portion 51 and the extension portion 52. The grease 260 is formed such that a cross-sectional area of a cross section along a vertical plane of the common axis O gradually increases from an end portion on the outer side in the axial direction toward the inner side in the axial direction.

The grease 260 includes a first annular portion 260a that is in contact with the outer ring 20 and a second annular portion 260b that is continuous with the first annular portion 260a and in contact with the sealing member 50. The first annular portion 260a and the second annular portion 260b are formed by applying grease twice. The first annular portion 260a and the second annular portion 260b extend in a circumferential shape around the common axis O. At least one of the first annular portion 260a and the second annular portion 260b may extend less than 360° about the common axis O. The first annular portion 260a includes the outer ring contact portion 261. The second annular portion 260b is disposed on an opposite side of the outer ring 20 in the radial direction (that is, on the inner side in the radial direction) with respect to the first annular portion 260a. The second annular portion 260b is integrally connected to the first annular portion 260a on the outer side in the axial direction. The second annular portion 260b includes the sealing member contact portion 262.

In the present embodiment, a similar effect as that of the first embodiment is achieved. In addition, in the present embodiment, the recessed portion 24C opens to the end surface 22a of the protruding portion 22 facing upward, and the grease 260 is in contact with only the outward facing surface 24Ca of the recessed portion 24C. With this configuration, it is possible to prevent the grease 260 or base oil of the grease 260 from flowing out from the recessed portion 24C to the end surface 22a side and leaking from the gap between the end surface 22a and the pedestal portion 51 of the sealing member 50.

In the fourth embodiment, the first annular portion 260a and the second annular portion 260b extend in the circumferential shape, but the invention is not limited to this configuration. At least one of the first annular portion and the second annular portion may include particles disposed in a dot shape over an entire circumference. In this case, the plurality of particles aligned in the circumferential direction may be integrated or separated from each other.

Figure 10:
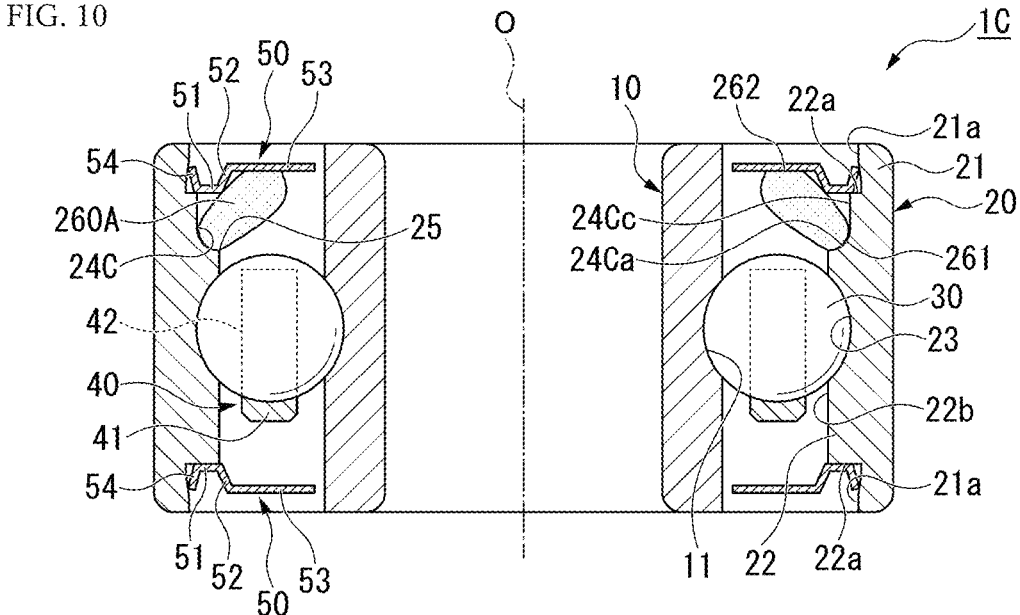
FIG. 10 is a longitudinal cross-sectional view of a rolling bearing according to a modification of the fourth embodiment.

In the fourth embodiment, the grease 260 includes the first annular portion 260a and the second annular portion 260b, but the invention is not limited to this configuration. As shown in FIG. 10, grease 260A may be formed of a single annular portion having the outer ring contact portion 261 and the sealing member contact portion 262.

Fifth Embodiment

Next, a fifth embodiment will be described with reference to FIG. 11. A rolling bearing 1D according to the fifth embodiment is different from the rolling bearing 1 according to the first embodiment in that grease 360 is disposed in the axial direction along a recessed portion 24D. Configurations other than those to be described below are similar as those of the first embodiment.

Figure 11:
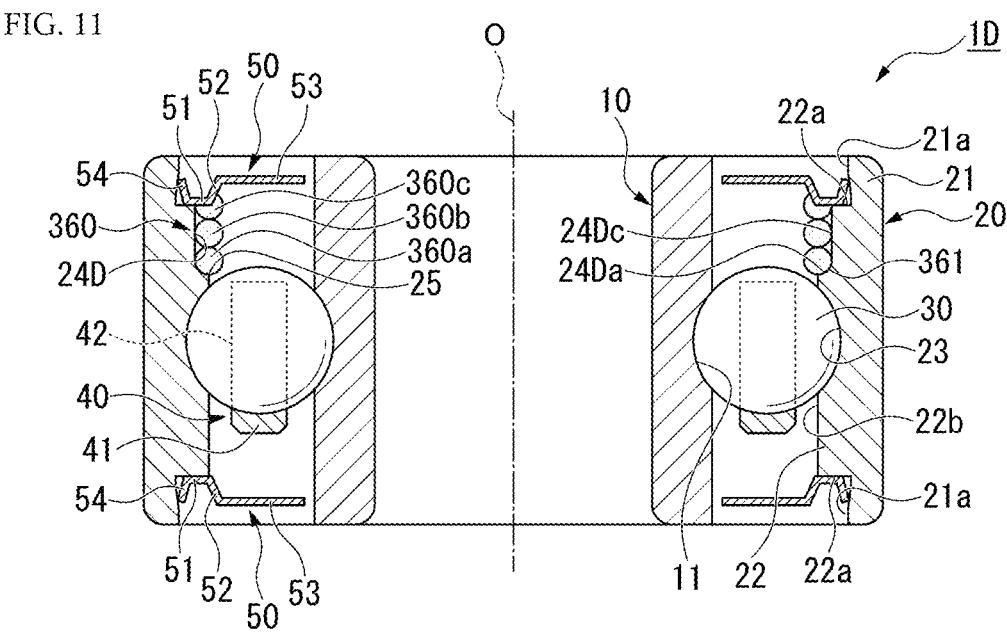
FIG. 11 is a longitudinal cross-sectional view of a rolling bearing according to a fifth embodiment.

FIG. 11 is a longitudinal cross-sectional view of the rolling bearing according to the fifth embodiment.

As shown in FIG. 11, the recessed portion 24D recessed outward in the radial direction is formed in the inner circumferential surface 22b of the protruding portion 22 of the outer ring 20. The recessed portion 24D is provided without an interval in the axial direction with respect to the end surface 22a of the protruding portion 22 facing upward, and is open to the inner circumferential surface 22b and the end surface 22a facing upward. The recessed portion 24D includes an outward facing surface 24Da facing a direction inclined outward in the axial direction with respect to the radial direction (inward and upward in the radial direction, or upward), and a cylindrical surface 24Dc facing inward in the radial direction. The outward facing surface 24Da is a recessed curved surface. The cylindrical surface 24Dc extends in the axial direction and is smoothly connected to the outward facing surface 24Da at an end edge on the inner side in the axial direction such that a tangent line with respect to the outward facing surface 24Da is continuous. The recessed portion 24D extends in the axial direction such that a width in the axial direction is larger than a depth in the radial direction on a longitudinal cross section of the rolling bearing 1D. The outward facing surface may be a flat surface facing outward in the axial direction or a conical surface facing outward in the axial direction and inward in the radial direction.

The grease 360 includes an outer ring contact portion 361 that is in contact with the inner circumferential surface 22b of the protruding portion 22 of the outer ring 20. The outer ring contact portion 361 is in contact with the recessed portion 24D of the inner circumferential surface 22b of the protruding portion 22. The outer ring contact portion 361 is in contact with the recessed portion 24D over an entire circumference. The outer ring contact portion 361 is in contact with the outward facing surface 24Da and the cylindrical surface 24Dc of the recessed portion 24D. The outer ring contact portion 361 is in contact with at least a part of the ridge portion 25 of the inner circumferential surface 22b. The grease 360 is in contact with the sealing member 50. In the present embodiment, the grease 360 is in contact with the pedestal portion 51 and the extension portion 52 of the sealing member 50.

The grease 360 is disposed in the axial direction along the recessed portion 24D on the longitudinal cross section of the rolling bearing 1D. The grease 360 includes a first annular portion 360a, a second annular portion 360b, and a third annular portion 360c disposed in the axial direction. The first annular portion 360a, the second annular portion 360b, and the third annular portion 360c are formed by applying grease three times. The first annular portion 360a, the second annular portion 360b, and the third annular portion 360c extend in a circumferential shape around the common axis O. At least one of the first annular portion 360a, the second annular portion 360b, and the third annular portion 360c may extend less than 360° about the common axis O. The first annular portion 360a is in contact with the outward facing surface 24Da and the cylindrical surface 24Dc of the recessed portion 24D. The second annular portion 360b is continuous with the first annular portion 360a on the outer side in the axial direction. The second annular portion 360b is in contact with the cylindrical surface 24Dc of the recessed portion 24D. The third annular portion 360c is continuous with the second annular portion 360b on the outer side in the axial direction. The third annular portion 360c is in contact with the cylindrical surface 24Dc of the recessed portion 24D and the sealing member 50.

In the present embodiment, a similar effect as that of the first embodiment is achieved. In addition, in the present embodiment, since the grease 360 is disposed in the axial direction along the recessed portion 24D, it is possible to effectively restrict, by the recessed portion 24D, the grease 360 from being displaced in the axial direction, and it is possible to prevent the grease 360 from being displaced and coming into contact with the rolling body 30 or the cage 40 by a desired amount or more. Further, a shape and position of the grease 360 are less likely to change due to vibration during transportation or storage for a long period (particularly, storage in a high-temperature environment). Therefore, it is possible to provide the rolling bearing 1D in which a fluctuation in the rotational resistance from an initial stage of manufacturing is reduced.

In the fifth embodiment, the first annular portion 360a, the second annular portion 360b, and the third annular portion 360c extend in the circumferential shape, but the invention is not limited to this configuration. At least one of the first annular portion, the second annular portion, and the third annular portion may include particles disposed in a dot shape over an entire circumference. In this case, the plurality of particles aligned in the circumferential direction may be integrated or separated from each other.

Figure 12:
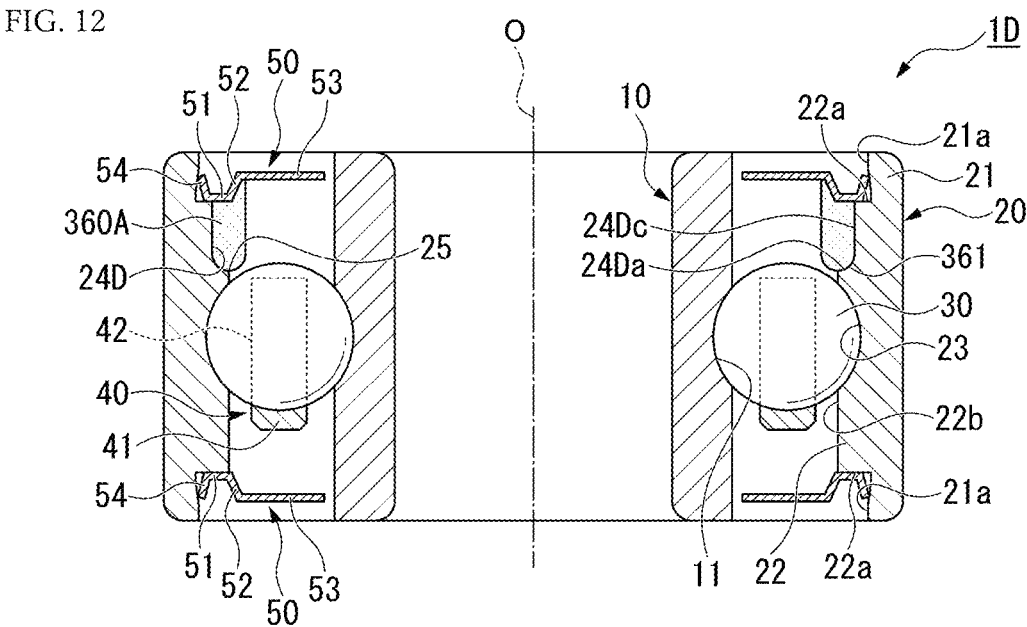
FIG. 12 is a longitudinal cross-sectional view of a rolling bearing according to a first modification of the fifth embodiment.

In the fifth embodiment, the grease 360 includes the first annular portion 360a, the second annular portion 360b, and the third annular portion 360c, but the invention is not limited to this configuration. As shown in FIG. 12, grease 360A may extend in the axial direction along the recessed portion 24D on the longitudinal cross section of the rolling bearing 1D.

Figure 13:
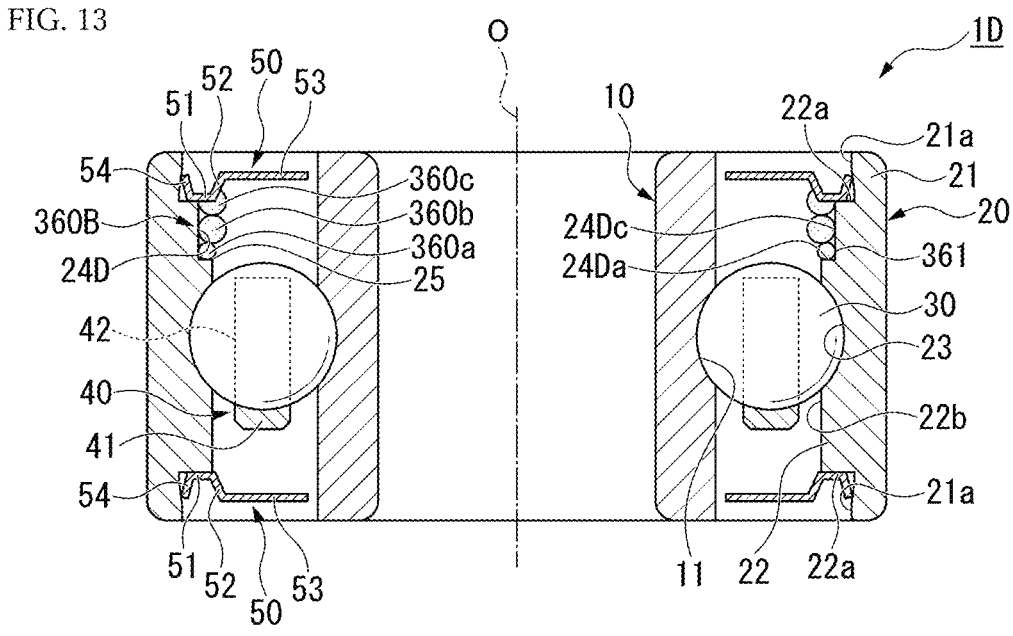
FIG. 13 is a longitudinal cross-sectional view of a rolling bearing according to a second modification of the fifth embodiment.

In the fifth embodiment, the grease 360 is in contact with the ridge portion 25 of the inner circumferential surface 22b of the protruding portion 22 of the outer ring 20, but the invention is not limited to this configuration. As shown in FIG. 13, grease 360B may not be in contact with the ridge portion 25. In this case, the first annular portion 360a may be formed smaller than the second annular portion 360b and the third annular portion 360c on the longitudinal cross section of the rolling bearing 1D so as not to contact the ridge portion 25. According to this configuration, in exchange for an insufficient supply of base oil of the grease 360B to the rolling body 30, a total amount of the grease 360B can be increased to provide higher durability to the rolling bearing 1D.

Sixth Embodiment

Next, a sixth embodiment will be described with reference to FIG. 14. A rolling bearing 1E according to the sixth embodiment is different from the rolling bearing 1 according to the first embodiment in that the deepest location of a recessed portion 24E in the radial direction is formed on the inner side in the axial direction relative to an intermediate position of the recessed portion 24E in the axial direction. Configurations other than those to be described below are similar as those of the first embodiment.

Figure 14:
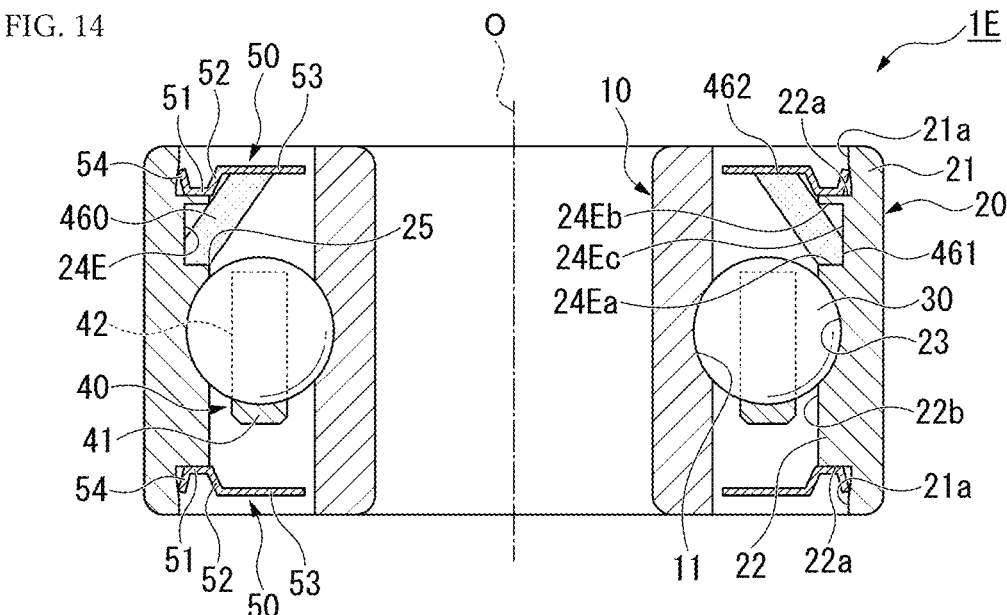
FIG. 14 is a longitudinal cross-sectional view of a rolling bearing according to a sixth embodiment.

FIG. 14 is a longitudinal cross-sectional view of the rolling bearing according to the sixth embodiment.

As shown in FIG. 14, the recessed portion 24E is provided with an interval in the axial direction with respect to the outer ring raceway surface 23. The recessed portion 24E is provided with an interval in the axial direction with respect to the end surface 22a facing upward. The recessed portion 24E is formed such that a width in the axial direction is larger than a depth in the radial direction on a longitudinal cross section of the rolling bearing 1E. The recessed portion 24E includes an outward facing surface 24Ea facing a direction inclined outward in the axial direction with respect to the radial direction (inward and upward in the radial direction, or upward), an inward facing surface 24Eb facing a direction inclined inward in the axial direction with respect to the radial direction (inward and downward in the radial direction, or downward), and a cylindrical surface 24Ec facing inward in the radial direction. In the present embodiment, the outward facing surface 24Ea and the inward facing surface 24Eb face the axial direction. Accordingly, the recessed portion 24E is formed in a rectangular shape on the longitudinal cross section of the rolling bearing 1E. The cylindrical surface 24Ec is located at the deepest position of the recessed portion 24E in the radial direction, and extends over, in the axial direction, the intermediate position in the recessed portion 24E in the axial direction. Accordingly, the deepest location of the recessed portion 24E in the radial direction is formed on the inner side in the axial direction relative to the intermediate position of the recessed portion 24E in the axial direction.

The grease 460 includes an outer ring contact portion 461 (bearing ring contact portion) that is in contact with the inner circumferential surface 22b of the protruding portion 22 of the outer ring 20, and a sealing member contact portion 462 that is in contact with the planar portion 53 of the sealing member 50 on the outer side in the axial direction and the inner side in the radial direction relative to the outer ring contact portion 461. The outer ring contact portion 461 is in contact with the recessed portion 24E of the inner circumferential surface 22b of the protruding portion 22. The outer ring contact portion 461 is in contact with the recessed portion 24E over an entire circumference. The outer ring contact portion 461 is in contact with the outward facing surface 24Ea and the cylindrical surface 24Ec of the recessed portion 24E. The outer ring contact portion 461 is in contact with at least a part of the ridge portion 25 of the inner circumferential surface 22b. The grease 460 is not in contact with the inward facing surface 24Eb of the recessed portion 24E. The grease 460 may be in contact with the inward facing surface 24Eb of the recessed portion 24E. In the present embodiment, the sealing member contact portion 462 is a location of the grease 460 that is in contact with the planar portion 53 of the sealing member 50. In the present embodiment, the grease 460 is not in contact with the pedestal portion 51 and the extension portion 52 of the sealing member 50. The grease 460 may be in contact with at least one of the pedestal portion 51 and the extension portion 52 of the sealing member 50. In this case, an area of the sealing member contact portion 462 is preferably larger than a contact area between the grease 260 and the extension portion 52 and the pedestal portion 51. The grease 460 extends outward in the axial direction and inward in the radial direction from the outer ring contact portion 461 toward the sealing member contact portion 462.

In the present embodiment, a similar effect as that of the first embodiment is achieved. In addition, in the present embodiment, the deepest location of the recessed portion 24E in the radial direction is formed on the inner side in the axial direction relative to the intermediate position of the recessed portion 24E in the axial direction. According to this configuration, when the grease 460 is discharged from a nozzle and applied to a predetermined location, a tip end of the nozzle is easily inserted into the outer ring 20 and the inner ring 10 from an outside of the rolling bearing 1E and brought close to the recessed portion 24E. Thus, it is possible to improve productivity of the small-diameter rolling bearing 1E. Since the nozzle can be easily brought close to the recessed portion 24E, the grease 460 can be accurately applied, and it is possible to prevent the grease 460 from coming into contact with the rolling body 30 or the like by a desired amount or more. Thus, rotational resistance of the rolling bearing 1E can be reduced.

Figure 15:
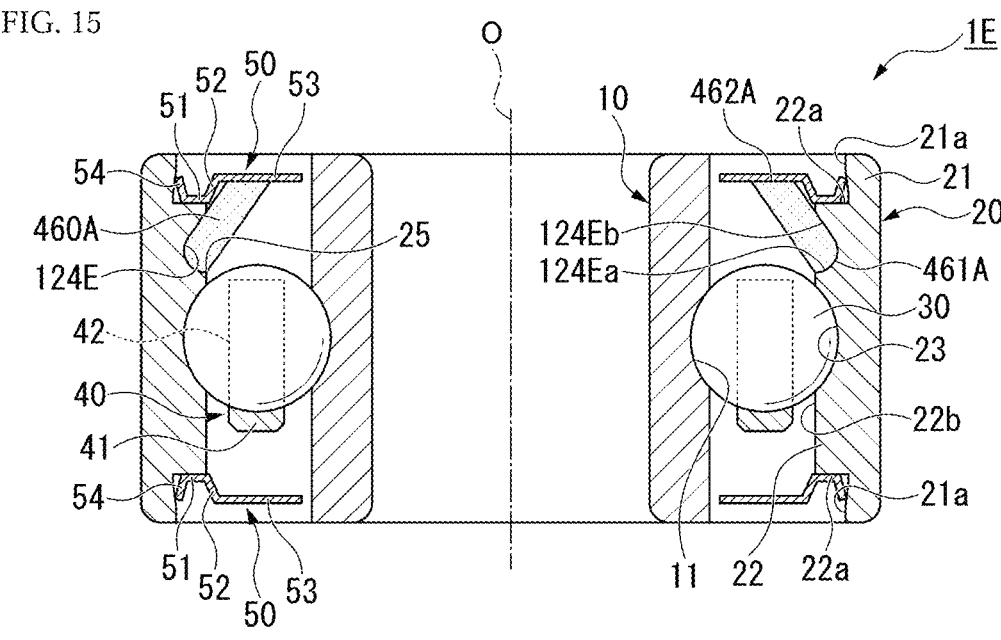
FIG. 15 is a longitudinal cross-sectional view of a rolling bearing according to a first modification of the sixth embodiment.
Figure 16:
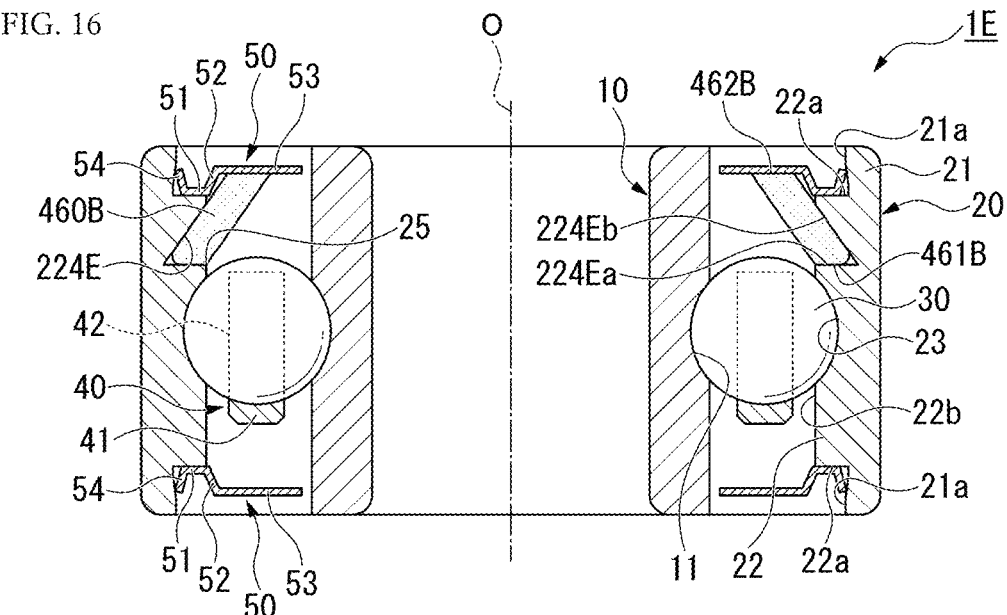
FIG. 16 is a longitudinal cross-sectional view of a rolling bearing according to a second modification of the sixth embodiment.

In the sixth embodiment, the recessed portion 24E is formed symmetrically in an upper-lower direction on the longitudinal cross section of the rolling bearing 1E, but the invention is not limited to this configuration. As shown in FIGS. 15 and 16, recessed portions 124E and 224E may be formed non-symmetrically in the upper-lower direction on the longitudinal cross section of the rolling bearing 1E. Hereinafter, modifications shown in FIGS. 15 and 16 will be described.

In a first modification shown in FIG. 15, the recessed portion 124E is formed such that a width in the axial direction is larger than a depth in the radial direction on the longitudinal cross section of the rolling bearing 1E. The recessed portion 124E includes an outward facing surface 124Ea facing a direction inclined outward in the axial direction with respect to the radial direction (inward and upward in the radial direction, or upward), and an inward facing surface 124Eb facing a direction inclined inward in the axial direction with respect to the radial direction (inward and downward in the radial direction, or downward). The outward facing surface 124Ea is a curved surface recessed inward in the axial direction and outward in the radial direction. The inward facing surface 124Eb is a conical surface extending outward in the axial direction and inward in the radial direction from an end edge of the outward facing surface 124Ea on the outer side in the axial direction. A connection portion between the outward facing surface 124Ea and the inward facing surface 124Eb is disposed on the inner side in the axial direction relative to an intermediate position of the recessed portion 124E in the axial direction. Accordingly, the deepest location of the recessed portion 124E in the radial direction is formed on the inner side in the axial direction relative to the intermediate position of the recessed portion 124E in the axial direction.

Grease 460A includes an outer ring contact portion 461A (bearing ring contact portion) that is in contact with the inner circumferential surface 22b of the protruding portion 22 of the outer ring 20, and a sealing member contact portion 462A that is in contact with the planar portion 53 of the sealing member 50 on the outer side in the axial direction and the inner side in the radial direction relative to the outer ring contact portion 461A. The outer ring contact portion 461A is in contact with the recessed portion 124E of the inner circumferential surface 22b of the protruding portion 22. The outer ring contact portion 461A is in contact with the recessed portion 124E over an entire circumference. The outer ring contact portion 461A is in contact with the outward facing surface 124Ea of the recessed portion 124E. The outer ring contact portion 461A is in contact with the inward facing surface 124Eb of the recessed portion 124E. The outer ring contact portion 461A is in contact with the connection portion between the outward facing surface 124Ea and the inward facing surface 124Eb of the recessed portion 124E. The grease 460A is not in contact with the ridge portion 25 of the inner circumferential surface 22b. The grease 460A may be in contact with the ridge portion 25 of the inner circumferential surface 22b.

In the present modification, the sealing member contact portion 462A is a location of the grease 460A that is in contact with the planar portion 53 of the sealing member 50. In the present modification, the grease 460A is not in contact with the pedestal portion 51 and the extension portion 52 of the sealing member 50. The grease 460A may be in contact with at least one of the pedestal portion 51 and the extension portion 52 of the sealing member 50. In this case, an area of the sealing member contact portion 462A is preferably larger than a contact area between the grease 460A and the extension portion 52 and the pedestal portion 51. The grease 460A may be formed such that a cross-sectional area of a cross section along a vertical plane of the common axis O gradually increases from an end portion on the outer side in the axial direction toward the inner side in the axial direction. The grease 460A extends outward in the axial direction and inward in the radial direction from the outer ring contact portion 461A toward the sealing member contact portion 462A. The grease 460A extends from the outer ring contact portion 461A along the inward facing surface 124Eb of the recessed portion 124E.

In a second modification shown in FIG. 16, a recessed portion 224E is formed such that a width in the axial direction is larger than a depth in the radial direction on the longitudinal cross section of the rolling bearing 1E. The recessed portion 224E includes an outward facing surface 224Ea facing a direction inclined outward in the axial direction with respect to the radial direction (inward and upward in the radial direction, or upward), and an inward facing surface 224Eb facing a direction inclined inward in the axial direction with respect to the radial direction (inward and downward in the radial direction, or downward). The outward facing surface 224Ea is a plane facing outward in the axial direction. The inward facing surface 224Eb is a conical surface extending outward in the axial direction and inward in the radial direction from an end edge of the outward facing surface 224Ea on the outer side in the radial direction. A connection portion between the outward facing surface 224Ea and the inward facing surface 224Eb is disposed inward in the axial direction of an intermediate position of the recessed portion 224E in the axial direction. Accordingly, the deepest location of the recessed portion 224E in the radial direction is formed on the inner side in the axial direction relative to the intermediate position of the recessed portion 224E in the axial direction.

Grease 460B includes an outer ring contact portion 461B (bearing ring contact portion) that is in contact with the inner circumferential surface 22b of the protruding portion 22 of the outer ring 20, and a sealing member contact portion 462B that is in contact with the planar portion 53 of the sealing member 50 on the outer side in the axial direction and the inner side in the radial direction relative to the outer ring contact portion 461B. The outer ring contact portion 461B is in contact with the recessed portion 224E of the inner circumferential surface 22b of the protruding portion 22. The outer ring contact portion 461B is in contact with the recessed portion 224E over an entire circumference. The outer ring contact portion 461B is in contact with the outward facing surface 224Ea of the recessed portion 224E. The outer ring contact portion 461B is in contact with the inward facing surface 224Eb of the recessed portion 224E. The outer ring contact portion 461B is not in contact with a connection portion between the outward facing surface 224Ea and the inward facing surface 224Eb of the recessed portion 224E. The grease 460B is not in contact with the ridge portion 25 of the inner circumferential surface 22b.

The grease 460B may be in contact with the ridge portion 25 of the inner circumferential surface 22b.

In the present modification, the sealing member contact portion 462B is a location of the grease 460B that is in contact with the planar portion 53 of the sealing member 50. In the present modification, the grease 460B is not in contact with the pedestal portion 51 and the extension portion 52 of the sealing member 50. The grease 460B may be in contact with at least one of the pedestal portion 51 and the extension portion 52 of the sealing member 50. In this case, an area of the sealing member contact portion 462B is preferably larger than a contact area between the grease 460B and the extension portion 52 and the pedestal portion 51. The grease 460B may be formed such that a cross-sectional area of a cross section along a vertical plane of the common axis O gradually increases from an end portion on the outer side in the axial direction toward the inner side in the axial direction. The grease 460B extends outward in the axial direction and inward in the radial direction from the outer ring contact portion 461B toward the sealing member contact portion 462B. The grease 460B extends from the outer ring contact portion 461B along the inward facing surface 224Eb of the recessed portion 224E.

The rolling bearing 1E according to these modification also achieves a similar effect as those of the sixth embodiment.

Seventh Embodiment

Next, a seventh embodiment will be described with reference to FIG. 17. A rolling bearing IF according to the seventh embodiment is different from the rolling bearing 1 according to the first embodiment in a shape of the inner circumferential surface 22b of the protruding portion 22 of the outer ring 20. Configurations other than those to be described below are similar as those of the first embodiment.

Figure 17:
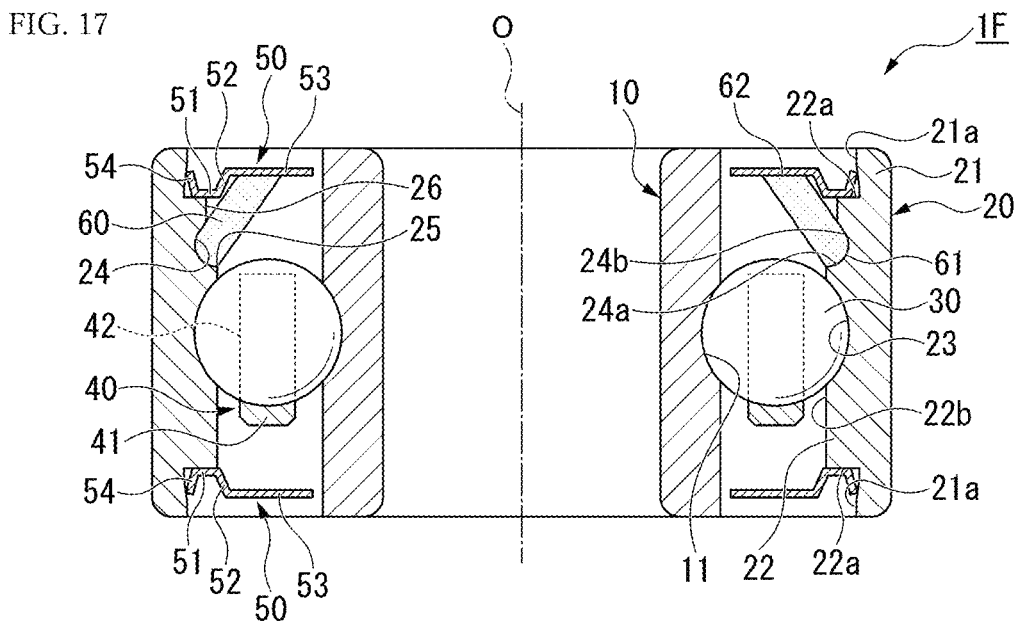
FIG. 17 is a longitudinal cross-sectional view of a rolling bearing according to a seventh embodiment.

FIG. 17 is a longitudinal cross-sectional view of the rolling bearing according to the seventh embodiment.

As shown in FIG. 17, the inner circumferential surface 22b of the protruding portion 22 of the outer ring 20 includes the recessed portion 24 and a connection surface 26. The recessed portion 24 is provided with an interval in the axial direction with respect to the end surface 22a of the protruding portion 22 facing upward. The connection surface 26 is formed between the recessed portion 24 and the end surface 22a of the protruding portion 22 facing upward. The connection surface 26 extends in the axial direction and faces inward in the radial direction. The connection surface 26 is located outward in the radial direction so as to be further away from the inner ring 10 in the radial direction than an end edge of the outer ring raceway surface 23 in the axial direction.

In the present embodiment, a similar effect as that of the first embodiment is achieved. In addition, in the present embodiment, the inner circumferential surface 22b of the protruding portion 22 of the outer ring 20 has the connection surface 26 formed between the recessed portion 24 and the end surface 22a. The connection surface 26 is located on the outer side in the radial direction relative to the end edge in the axial direction of the outer ring raceway surface 23 in the radial direction. According to this configuration, since the grease 60 is discharged from a nozzle and applied to a predetermined location, when a tip end of the nozzle is inserted into the outer ring 20 and the inner ring 10 from an outside of the rolling bearing IF, it is possible to make the connection surface 26 less likely to come into contact with the nozzle. Therefore, the nozzle can be easily brought close to the recessed portion 24 when the grease 60 is applied, and productivity of the small-diameter rolling bearing IF can be improved. Since the nozzle can be easily brought close to the recessed portion 24, the grease 60 can be accurately applied, and it is possible to prevent the grease 60 from coming into contact with the rolling body 30 or the like by a desired amount or more. Thus, rotational resistance of the rolling bearing IF can be reduced.

Eighth Embodiment

Next, an eighth embodiment will be described with reference to FIG. 18. A rolling bearing 1G according to the eighth embodiment is different from the rolling bearing 1 according to the first embodiment in a shape of the inner circumferential surface 22b of the protruding portion 22 of the outer ring 20. Configurations other than those to be described below are similar as those of the first embodiment.

Figure 18:
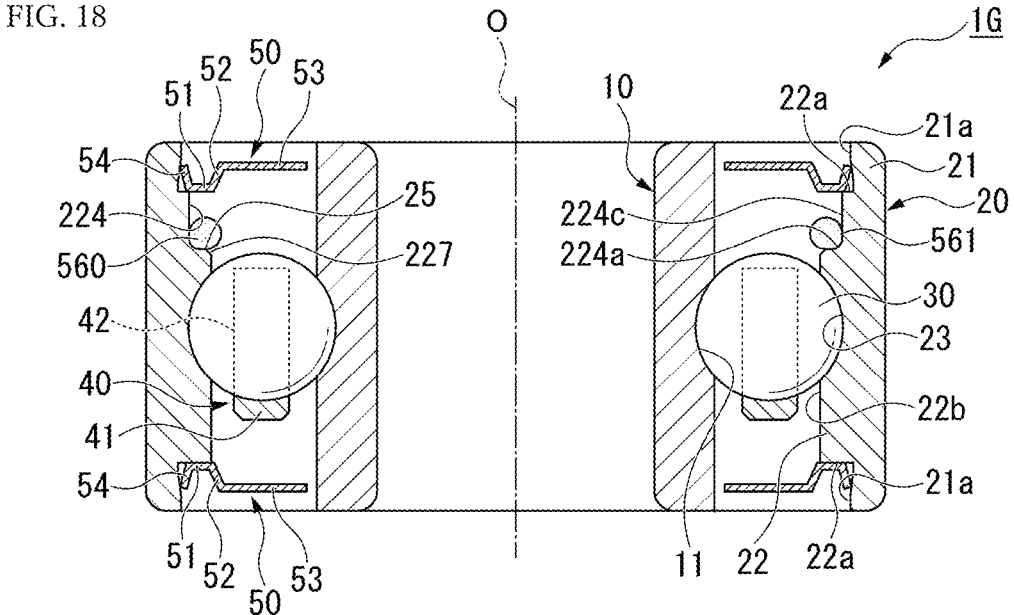
FIG. 18 is a longitudinal cross-sectional view of a rolling bearing according to an eighth embodiment.

FIG. 18 is a longitudinal cross-sectional view of the rolling bearing according to the eighth embodiment.

As shown in FIG. 18, the inner circumferential surface 22b of the protruding portion 22 of the outer ring 20 includes a recessed portion 224 and an inclined portion 227. The recessed portion 224 is provided without an interval in the axial direction with respect to the end surface 22a of the protruding portion 22 facing upward, and is open to the inner circumferential surface 22b and the end surface 22a facing upward. The recessed portion 224 includes an outward facing surface 224a facing a direction inclined outward in the axial direction with respect to the radial direction (inward and upward in the radial direction, or upward), and a cylindrical surface 224c facing inward in the radial direction. The outward facing surface 224a is a recessed curved surface. An end edge of the outward facing surface 224a on the inner side in the radial direction is located on the outer side in the radial direction relative to the end edge in the axial direction of the outer ring raceway surface 23 in the radial direction. The cylindrical surface 224c extends in the axial direction and is connected to an end edge of the outward facing surface 224a on the outer side in the axial direction. The inclined portion 227 extends from an end edge of the recessed portion 224 on the outer ring raceway surface 23 side (an end edge of the outward facing surface 224a on the inner side in the radial direction) toward the outer ring raceway surface 23 side while being inclined with respect to the radial direction and the axial direction. That is, the inclined portion 227 extends inward in the radial direction and inward in the axial direction from the ridge portion 25 of the inner circumferential surface 22b. In the present embodiment, the inclined portion 227 extends linearly from the end edge of the recessed portion 224 on a longitudinal cross section of the rolling bearing 1G. The inclined portion may extend at a steeper inclination with respect to the radial direction than the recessed portion 224 with a connection portion between the inclined portion and the recessed portion 224 as a boundary on the longitudinal cross section of the rolling bearing 1G. The inclined portion 227 is provided with an interval in the axial direction with respect to the outer ring raceway surface 23.

Grease 560 includes an outer ring contact portion 561 that is in contact with the inner circumferential surface 22b of the protruding portion 22 of the outer ring 20. The outer ring contact portion 561 is in contact with the recessed portion 224 of the inner circumferential surface 22b of the protruding portion 22. The outer ring contact portion 561 is in contact with the recessed portion 224 over an entire circumference. The outer ring contact portion 561 is in contact with the outward facing surface 224*a* and the cylindrical surface 224*c* of the recessed portion 224. The outer ring contact portion 561 is in contact with at least a part of the ridge portion 25 of the inner circumferential surface 22*b*. The outer ring contact portion 561 is preferably not in contact with the inclined portion 227. The grease 560 may be in contact with the sealing member 50.

In the present embodiment, a similar effect as that of the first embodiment is achieved. In addition, in the present embodiment, the inner circumferential surface 22*b* of the protruding portion 22 of the outer ring 20 includes the inclined portion 227 extending from the end edge of the recessed portion 224 on the outer ring raceway surface 23 side toward the outer ring raceway surface 23 side while being inclined with respect to the radial direction and the axial direction. According to this configuration, even when an end portion of the recessed portion 224 on the outer ring raceway surface 23 side extends along the radial direction, the inner circumferential surface 22*b* is gradually inclined from the recessed portion 224 toward the outer ring raceway surface 23. Therefore, it is possible to promote flow of base oil oozing from the grease 560 from the recessed portion 224 along the inclined portion 227 toward the outer ring raceway surface 23. Therefore, even when the grease 560 is not disposed close to the outer ring raceway surface 23, an insufficient supply of the base oil of the grease 560 to the rolling body 30 can be prevented.

Figure 19:
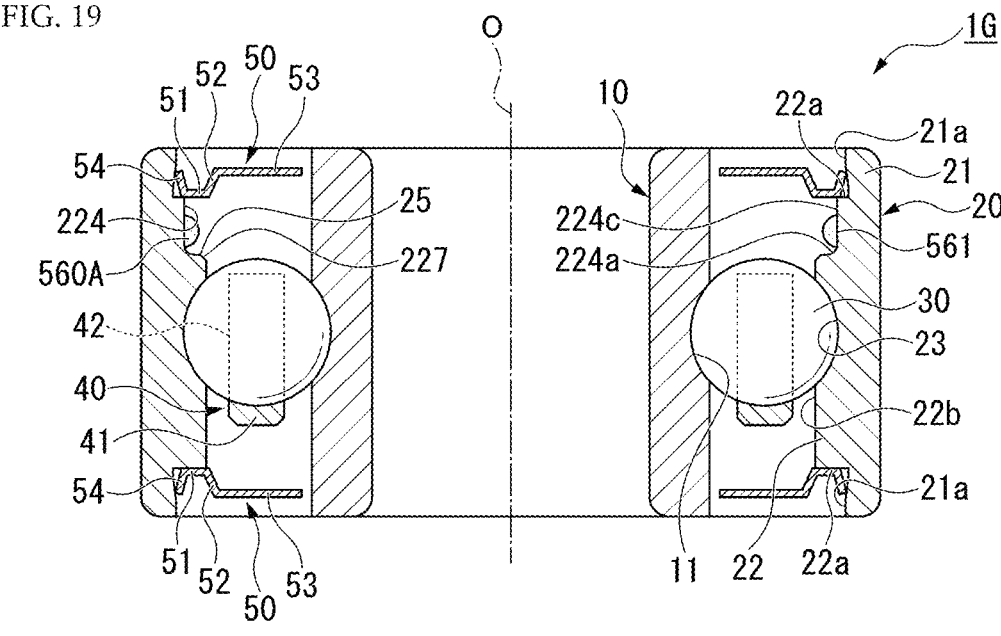
FIG. 19 is a longitudinal cross-sectional view of a rolling bearing according to a first modification of the eighth embodiment.

As shown in FIG. 19, grease 560A may be disposed so as not to protrude from an inner side of the recessed portion 224 toward the inclined portion 227 side (inner side) in the radial direction. That is, the grease 560A may not be located within a formation range of the inclined portion 227 in the radial direction. With this configuration, the grease 560A can be prevented from coming into contact with the rolling body 30. On the other hand, by reducing an amount of the grease 560A applied, it is possible to suitably obtain an effect of preventing an insufficient supply of base oil of the grease 560A to the rolling body 30 as described above.

Figure 20:
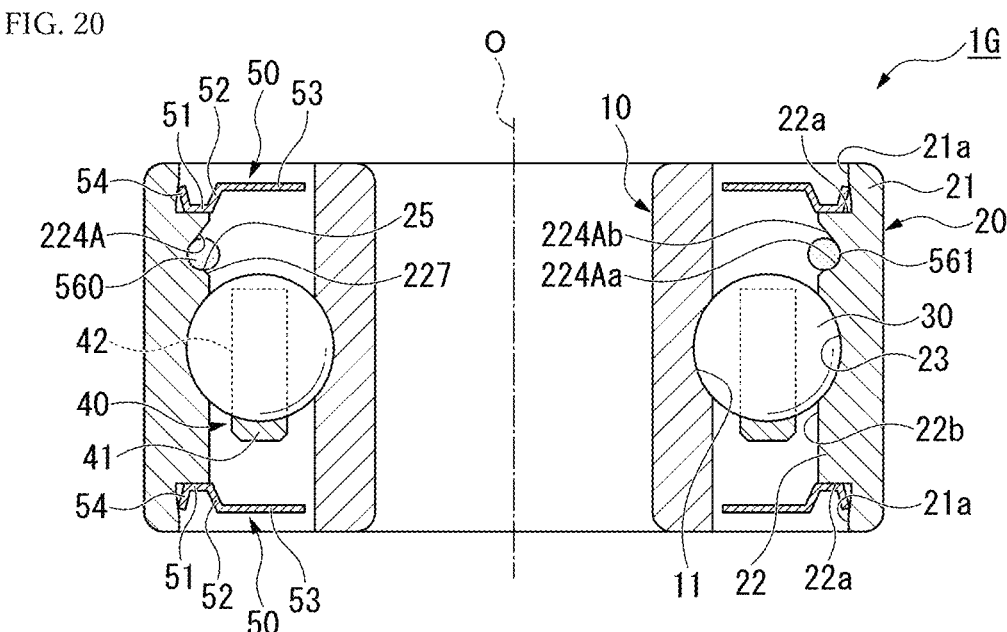
FIG. 20 is a longitudinal cross-sectional view of a rolling bearing according to a second modification of the eighth embodiment.

In the eighth embodiment, the recessed portion 224 is provided without an interval in the axial direction with respect to the end surface 22*a* of the protruding portion 22 facing upward, but the invention is not limited to this configuration. That is, as shown in FIG. 20, a recessed portion 224A may be provided with an interval in the axial direction with respect to the end surface 22*a* facing upward. In the shown example, the recessed portion 224A includes an outward facing surface 224Aa facing a direction inclined outward in the axial direction with respect to the radial direction and an inward facing surface 224Ab facing a direction inclined inward in the axial direction with respect to the radial direction, but a shape of the recessed portion is not particularly limited.

The invention is not limited to the embodiments described above with reference to the drawings, and various modifications are conceivable within the technical scope of the invention.

For example, in the above embodiments, the inner ring 10 is provided as a rotating ring, and the outer ring 20 is provided as a fixed ring. The grease 60, 160, 160A, 260, 260A, 360, 360A, 360B, 460, 460A, 460B, 560, and 560A is in contact with the outer ring 20 that is the fixed ring. However, the bearing ring with which the grease comes into contact may not be the fixed ring. That is, the inner ring may be provided as the fixed ring, the outer ring may be provided as the rotating ring, and the grease may be in contact with the inner ring that is the fixed ring. The inner ring may be provided as the fixed ring, the outer ring may be provided as the rotating ring, and the grease may be in contact with the outer ring that is the rotating ring.

In the above embodiments, the grease 60, 160, 160A, 260, 260A, 360, 360A, 360B, 460, 460A, 460B, 560, and 560A is in contact with the recessed portion over an entire circumference, but the invention is not limited to this configuration. The grease may be in contact with only a portion of the recessed portion in the circumferential direction.

In the above embodiments, the grease 60, 160, and 160A is not in contact with the pedestal portion 51 and the extension portion 52 of the sealing member 50, but the invention is not limited to this configuration. The grease may be in contact with at least one of the pedestal portion 51 and the extension portion 52 of the sealing member 50, as long as an area of the sealing member contact portion is larger than a contact area between the grease and the extension portion 52 and the pedestal portion 51.

In the above embodiments, the grease 60, 160, 160A, 260, 260A, 360, 360A, 360B, 460, 460A, 460B, 560, and 560A is not in contact with the inner ring 10 and the cage 40, but the invention is not limited to this configuration. As described above, in the above embodiments, it is possible to prevent the grease from spreading largely toward the inner ring 10 side and the rolling body 30 side when the sealing member 50 is mounted. Therefore, even if the grease comes into contact with at least one of the inner ring 10 and the cage 40, a contact portion can be made sufficiently small compared with a structure in the related art, and an effect of reducing the rotational resistance can be obtained.

Grease other than the grease 60, 160, 160A, 260, 260A, 360, 360A, 360B, 460, 460A, 460B, 560, and 560A may be disposed in the rolling bearing. In the above embodiments, the grease is disposed on the opposite side of the annular portion 41 of the cage 40 across the rolling body 30 in the axial direction. However, the grease may also be disposed on an annular portion 41 side of the cage 40 with respect to the rolling body 30 in the axial direction. For example, the rolling bearing may further include grease applied to a grease pocket, a lower end surface, or the like of the cage.

Although the fan motor is exemplified as the rotating device in the embodiments, the rotating device is not limited thereto. For example, the invention may be applied to a dental handpiece, a spindle motor of a hard disk drive, and the like as the rotating device.

In addition, components in the above-described embodiments can be appropriately replaced with well-known components without departing from the gist of the invention, and the above-described embodiments and modifications may be appropriately combined.

The invention claimed is:

1. A rolling bearing comprising:

an inner ring and an outer ring disposed coaxially with each other;

a rolling body disposed between the inner ring and the outer ring;

a sealing member mounted on the inner ring or the outer ring and covering a space between the inner ring and the outer ring from an outer side in an axial direction; and grease disposed between the rolling body and the sealing member, wherein one bearing ring of the inner ring and the outer ring has a circumferential surface facing the other bearing ring, the circumferential surface is formed with a raceway surface that supports the rolling body in a rollable manner, and a recessed portion that is provided at a location extending in the axial direction from an end edge of the raceway surface in the axial direction and is recessed in a radial direction, the grease is in contact with the recessed portion and the sealing member, and the recessed portion has a location that faces a direction inclined inward in the axial direction with respect to the radial direction.

2. The rolling bearing according to claim 1, wherein the grease is in contact with a location of the recessed portion that faces a direction inclined outward in the axial direction with respect to the radial direction.

3. The rolling bearing according to claim 1, wherein the recessed portion is provided with an interval in the axial direction with respect to the raceway surface.

4. The rolling bearing according to claim 1, wherein the one bearing ring has a protruding portion that protrudes toward the other bearing ring side and on which the circumferential surface is formed, the protruding portion has an end surface that faces outward in the axial direction and is connected to the circumferential surface at a circumferential edge on the other bearing ring side, and the recessed portion is provided with an interval in the axial direction with respect to the end surface.

5. The rolling bearing according to claim 1, wherein the recessed portion continuously extends throughout a circumferential direction.

6. The rolling bearing according to claim 1, wherein the grease is in contact with a ridge portion formed at an end edge of the recessed portion on a raceway surface side.

7. The rolling bearing according to claim 1, wherein the one bearing ring has a protruding portion that protrudes toward the other bearing ring side and on which the circumferential surface is formed, the protruding portion has an end surface that faces outward in the axial direction and is connected to the circumferential surface at a circumferential edge on the other bearing ring side, the circumferential surface has a connection surface formed between the recessed portion and the end surface, and the connection surface is further away from the other bearing ring in the radial direction than the end edge of the raceway surface in the axial direction.

8. The rolling bearing according to claim 1, wherein the circumferential surface comprises an inclined portion extending from an end edge of the recessed portion on a raceway surface side toward the raceway surface side while being inclined with respect to the radial direction and the axial direction.

9. The rolling bearing according to claim 8, wherein the grease is disposed so as not to protrude from an inner side of the recessed portion toward the inclined portion side in the radial direction.

10. The rolling bearing according to claim 1, wherein the sealing member comprises an annular pedestal portion that is in contact with the one bearing ring from the outer side in the axial direction, an extension portion that extends outward in the axial direction from a circumferential edge of the pedestal portion on the other bearing ring side, and a planar portion that extends along the radial direction from an end edge of the extension portion on the outer side in the axial direction toward the other bearing ring, the grease comprises a bearing ring contact portion that is in contact with the circumferential surface of the one bearing ring, and a sealing member contact portion that is in contact with the planar portion on the outer side in the axial direction and the other bearing ring side relative to the bearing ring contact portion, and an area of the sealing member contact portion is larger than a contact area between the grease and the extension portion and the pedestal portion of the sealing member.

11. The rolling bearing according to claim 10, wherein the sealing member contact portion comprises a center position of the grease in the radial direction when viewed from the axial direction.

12. The rolling bearing according to claim 10, wherein the grease is not in contact with the extension portion.

13. The rolling bearing according to claim 10, wherein the bearing ring contact portion is provided with an interval in the axial direction with respect to a contact portion between the one bearing ring and the pedestal portion.

14. The rolling bearing according to claim 10, wherein the grease is not in contact with the pedestal portion.

15. The rolling bearing according to claim 10, wherein the one bearing ring has a protruding portion that protrudes toward the other bearing ring side and on which the raceway surface is formed, the protruding portion has an end surface that faces outward in the axial direction, is connected to the circumferential surface at a circumferential edge on the other bearing ring side, and is in contact with the pedestal portion, and the pedestal portion is disposed so as not to protrude further toward the other bearing ring side than the end surface when viewed from the axial direction.

16. A rotating device comprising:

a rotating body disposed to be rotatable;

a support body rotatably supporting the rotating body; and the rolling bearing according to claim 1 interposed between the rotating body and the support body.

17. A method for manufacturing a rolling bearing, the rolling bearing comprising an inner ring and an outer ring disposed coaxially with each other, a rolling body disposed between the inner ring and the outer ring, a sealing member mounted on the inner ring or the outer ring and covering a space between the inner ring and the outer ring from an outer side in an axial direction, and grease disposed between the rolling body and the sealing member, one bearing ring of the inner ring and the outer ring having a circumferential surface facing the other bearing ring, the circumferential surface being formed with a raceway surface that supports the rolling body in a rollable manner, and a recessed portion that is provided at a location extending in the axial direction from an end edge of the raceway surface in the axial direction and is recessed in a radial direction, and the recessed portion has a location that faces a direction inclined inward in the axial direction with respect to the radial direction; and the method for manufacturing the rolling bearing comprising:

an application step of applying the grease by bringing the grease into contact with the recessed portion, and a mounting step of bringing the sealing member close to the one bearing ring to contact with the grease.

18. The method for manufacturing the rolling bearing according to claim 17, wherein the sealing member comprises an annular pedestal portion that is in contact with the one bearing ring from the outer side in the axial direction, an extension portion that extends outward in the axial direction from a circumferential edge of the pedestal portion on the other bearing ring side of the inner ring and the outer ring, and a planar portion that extends along the radial direction from an end edge of the extension portion on the outer side in the axial direction toward the other bearing ring, in the application step, the grease is applied so as to protrude outward in the axial direction and toward the other bearing ring side from a contact portion with the one bearing ring, and the method for manufacturing the rolling bearing further comprises:

a contact step of bringing the sealing member close to the one bearing ring from the outer side in the axial direction and bringing the planar portion into contact with an end edge of the grease on the outer side in the axial direction; and after the contact step, a mounting step of bringing the sealing member close to the one bearing ring to bring the pedestal portion into contact with the one bearing ring from the outer side in the axial direction, and pressing the grease inward in the axial direction by the planar portion.

19. A rolling bearing comprising:

an inner ring and an outer ring disposed coaxially with each other;

a rolling body disposed between the inner ring and the outer ring;

a sealing member mounted on the inner ring or the outer ring and covering a space between the inner ring and the outer ring from an outer side in an axial direction; and grease disposed between the rolling body and the sealing member, wherein one bearing ring of the inner ring and the outer ring has a circumferential surface facing the other bearing ring, the circumferential surface is formed with a raceway surface that supports the rolling body in a rollable manner, and a recessed portion that is provided at a location extending in the axial direction from an end edge of the raceway surface in the axial direction and is recessed in a radial direction, the grease is in contact with the recessed portion, and the grease is in contact with a location of the recessed portion that faces a direction inclined outward in the axial direction with respect to the radial direction.

* * * * *